United States Patent
Antony et al.

(10) Patent No.: US 7,881,820 B2
(45) Date of Patent: Feb. 1, 2011

(54) METHOD AND SYSTEM FOR INVENTORY PLACEMENT ACCORDING TO EXPECTED ITEM PICKING RATES

(75) Inventors: Felix F. Antony, Issaquah, WA (US); Xiao Yu Li, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 793 days.

(21) Appl. No.: 11/512,631

(22) Filed: Aug. 30, 2006

(65) Prior Publication Data

US 2008/0071418 A1 Mar. 20, 2008

(51) Int. Cl.
*G06F 7/00* (2006.01)
(52) U.S. Cl. ................................... 700/214
(58) Field of Classification Search .......... 700/213, 700/214
See application file for complete search history.

(56) References Cited

U.S. PATENT DOCUMENTS

| | | | |
|---|---|---|---|
| 6,598,025 | B1 | 7/2003 | Hamilton et al. |
| 6,622,127 | B1 | 9/2003 | Klots et al. |
| 6,711,458 | B1 * | 3/2004 | Kofoed .................. 700/213 |
| 7,171,376 | B2 | 1/2007 | Ramakrishnan |
| 2004/0247421 | A1 * | 12/2004 | Saunders et al. ........... 414/500 |
| 2005/0149226 | A1 | 7/2005 | Stevens et al. |
| 2005/0251734 | A1 | 11/2005 | Gabelmann et al. |
| 2006/0085296 | A1 | 4/2006 | Strickland |
| 2006/0095331 | A1 | 5/2006 | O'Malley et al. |
| 2006/0136237 | A1 | 6/2006 | Spiegel et al. |
| 2007/0050235 | A1 | 3/2007 | Ouimet |
| 2007/0187496 | A1 | 8/2007 | Andersen et al. |

OTHER PUBLICATIONS

Graves et al., "A dynamic model for requirements planning with application to supply chain optimization," Operations Research, 1998, 15 pages.
International Search Report and Written Opinion from PCT/US 07/77283, mailed Nov. 7, 2008.

* cited by examiner

*Primary Examiner*—Gene Crawford
*Assistant Examiner*—Ramya Prakasam
(74) *Attorney, Agent, or Firm*—Robert C. Kowert; Meyertons, Hood, Kivlin, Kowert & Goetzel, P.C.

(57) ABSTRACT

A method and system for inventory placement according to expected item picking rates. In one embodiment, a method may include determining a respective expected picking rate for each of a number of inventory items, and dependent upon the expected picking rate, selecting a corresponding one of a number of zones of an inventory storage area for each of the items. The zones may be physically arranged within the inventory storage area such that a first, innermost zone is successively and at least partially surrounded by one or more other zones. The method may further include storing each of the items within the corresponding zones, such that the expected picking rates of members of a given group of items stored in a given zone are less than the expected picking rates of members of another group of items stored in a successive zone that at least partially surrounds the given zone.

28 Claims, 13 Drawing Sheets

METHOD AND SYSTEM FOR INVENTORY PLACEMENT ACCORDING TO EXPECTED ITEM PICKING RATES

BACKGROUND OF THE INVENTION

1. Field of the Invention

This invention relates to materials handling systems and, more particularly, to storage placement and selection of material within a materials handling system.

2. Description of the Related Art

An enterprise that receives, consumes, transforms or distributes material during the course of its operations may implement a materials handling system to coordinate how material is managed within the enterprise. For example, in a manufacturing context, material may include raw materials, feedstocks, parts, etc. that may arrive at a manufacturing facility for processing as well as intermediate or finished goods resulting from the manufacturing process. Similarly, in a distribution context, retailers, wholesalers and other types of distributors may receive materials such as goods or products and distribute them to clients or customers.

Material may be stored as inventory within an inventory facility and made available for ordering or use by clients or customers. For example, in a manufacturing context, a client may include a step of a manufacturing process that includes a particular type of material as an input, while in a retail context, a client may include a customer who places an order for a product. In conventional materials handling systems, like items often may be stored together within inventory. For example, items having a common Universal Product Code (UPC), Stock-Keeping Unit (SKU) code, or other designation (including proprietary designations) may be stored together within inventory.

When retrieval of material from inventory is necessary, for example in response to a client's order or to replenish a manufacturing process, one or several inventory items must be retrieved or "picked" from inventory and prepared for delivery to the requester or recipient. In an inventory environment that includes a large number of different items and services the demands of a number of different requesters, at any given time there may be a substantial number of outstanding requests for picking items. To improve picking productivity, a materials handling system may employ multiple item pickers distributed throughout an inventory facility and may assign different picking operations (including, in some cases, picking of different items for a single order) to different pickers.

The productivity of a given picker may generally depend on how many picking operations the given picker may complete per unit of time or effort. For example, if a picker moves a substantial distance between picking two items, the time spent moving without picking may be regarded as unproductive time. Correspondingly, reducing the distance a picker moves between successive picking operations may improve that picker's productivity.

However, a difficulty may arise when storing small quantities of certain inventory items within a relatively large inventory facility. For example, the quantity kept on hand of an item may be proportional to the relative demand for that item. But as the quantity of an item to be stored decreases, so does the number of possible discrete locations within the inventory facility where the item might be stored. For example, if only one indivisible unit of a given item is kept on hand, it cannot be stored in more than one location within the facility. If the facility is large and the given item is randomly placed within it, then it is possible that the given item may be quite far from the nearest picker at a time when the given item is requested to be picked. Thus, some picker may have to move a considerable distance from its current location to retrieve the given item, which may reduce that picker's productivity.

SUMMARY

Various embodiments of a method and system for inventory placement according to expected item picking rates are disclosed. In one embodiment, rather than placing inventory primarily randomly or opportunistically, inventory items may be organized into zones within an inventory facility according to the rates at which the items are expected to be picked from storage. The zones may be organized in an ordered geometric fashion such that infrequently picked items in an inner zone are at least partially surrounded by successive zones including more frequently picked items.

Such an organization of zones may exhibit the property that a section or envelope of the inventory facility that encompasses at least a portion of each zone may include, or may be probabilistically likely to include, at least one unit of each item stored within the facility, including those expected to be infrequently picked. At the same time, the envelope may typically be smaller than the inventory facility as a whole. By distributing pickers within such an envelope, the average distance moved by pickers between successive picking operations may be reduced relative to other placement schemes. For example, as item selection progresses, pickers may move through the inventory facility such that the envelope progresses about an axis included within an innermost zone. Such an axial progression may keep less frequently picked items located in inner zones within a consistent distance of pickers, which may reduce the frequency of long picker excursions to retrieve infrequently picked items.

In one particular embodiment, a method may include determining a respective expected picking rate for each of a number of inventory items, and dependent upon the expected picking rate, selecting a corresponding one of a number of zones of an inventory storage area for each of the inventory items. The zones may be physically arranged within the inventory storage area such that a first, innermost zone is successively and at least partially surrounded by one or more other zones. The method may further include storing each of the inventory items within the corresponding zones, such that the expected picking rates of members of a given group of items stored in a given zone are less than the respective expected picking rates of members of another group of items stored in a successive zone that at least partially surrounds the given zone.

In another particular embodiment, a method may include distributing a number of pickers within an envelope of an inventory storage area, where the envelope encompasses at least a portion of each of a number of zones physically arranged within the inventory storage area such that a first, innermost zone is successively and at least partially surrounded by one or more other zones, and where expected picking rates of members of a given group of items stored in a given zone are less than the expected picking rates of members of another group of items stored in a successive zone that at least partially surrounds the given zone. The method may further include instructing the pickers to select inventory items stored within the envelope such that over time, the envelope progresses through the inventory storage area about an axis included within the first, innermost zone.

Figure 1:
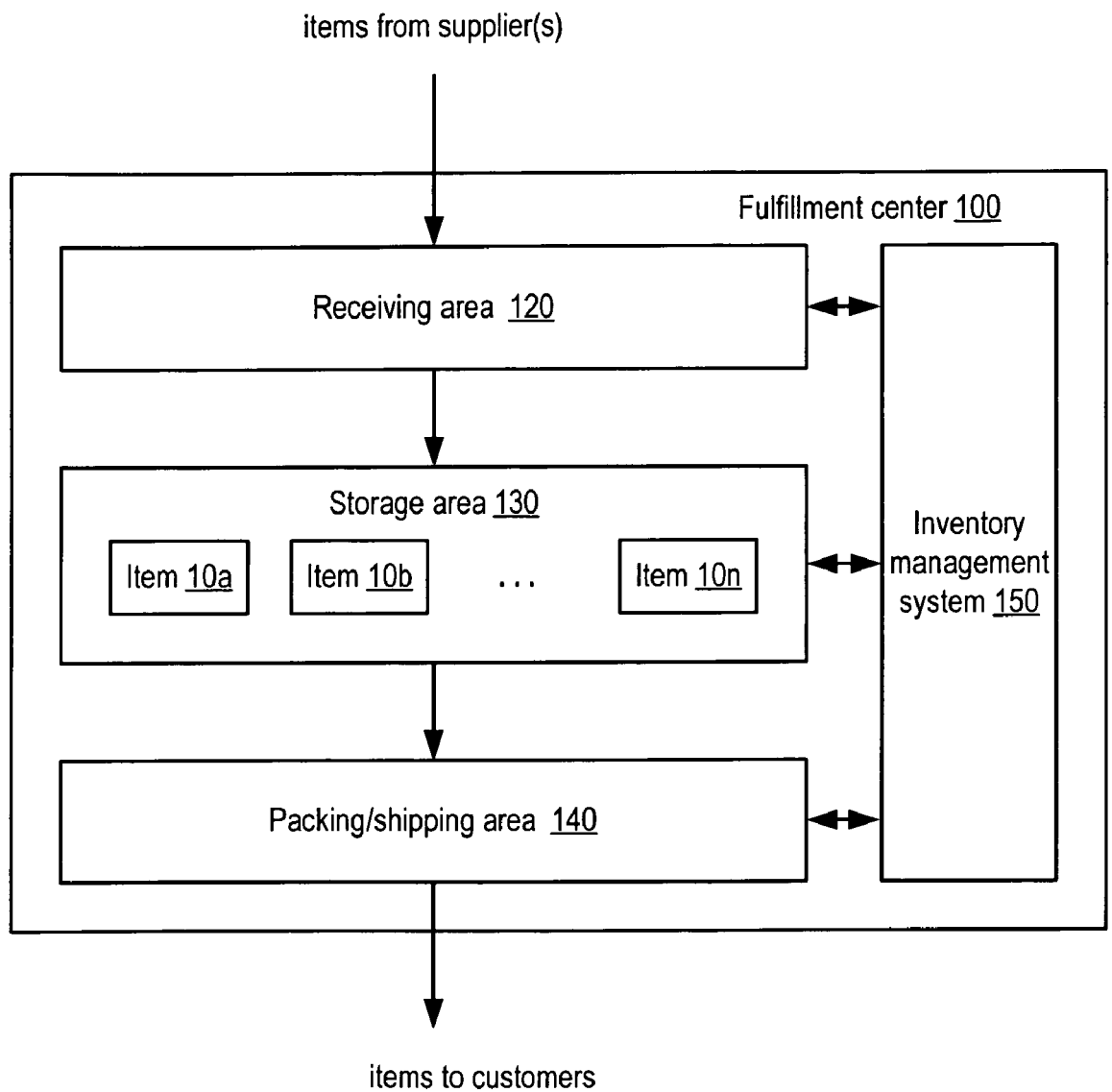
FIG. 1 is a block diagram illustrating one embodiment of a fulfillment center.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Introduction

As summarized above, in some embodiments storing inventory items within zones dependent upon expected item picking rates may improve the overall productivity of a materials handling process. Various embodiments of zone-based inventory placement are described in detail below. Owing to the complexity of the disclosed techniques, discussion is divided into several sections to facilitate exposition. However, it is noted that embodiments of the methods and systems are not limited by the section headings or the particular order in which aspects of the system are described. Further, it is noted that in the following discussion, materials handling is described in the context of fulfillment of customer orders from a fulfillment center configured to store inventory items. However, it is intended that the terms "order fulfillment" and "fulfillment center" encompass any type of materials handling system in which material is stored and selected in response to a request or order.

First, an overview of an exemplary fulfillment center embodiment is provided. Embodiments of methods of zone-based inventory item storage and examples of resulting inventory distributions are then discussed. Methods of picking and stowing inventory items stored in a zone-based fashion are also described, along with additional examples of geometries for inventory distribution. Finally, an exemplary control system embodiment configured to coordinate the actions of agents within an inventory storage facility is described.

Fulfillment Center Overview

An inventory facility or materials handling facility in which inventory selection for order fulfillment occurs may also be referred to as a fulfillment center. One embodiment of a fulfillment center configured to store inventory items is illustrated in FIG. 1. In the illustrated embodiment, fulfillment center 100 includes a receiving area 120, a storage area 130 configured to store an arbitrary number of items 10a-n, and a packing/shipping area 140. The arrangement of the various areas within the illustrated embodiment of fulfillment center 10 is depicted functionally rather than schematically. For example, in some embodiments, it is noted that multiple different receiving areas 120, storage areas 130 and packing/shipping areas 140 may be interspersed rather than segregated. Additionally, fulfillment center 100 includes an inventory management system 150 configured to interact with each of receiving area 120, storage area 130 and packing/shipping area 140. For example, as described below, system 150 may be configured to interact with other systems or agents located within the aforementioned areas.

Fulfillment center 100 may be configured to receive different kinds of items 10 from various suppliers and to store them until a customer order specifying particular ones of items 10 is received. The particular items 10 may then be selected from storage and sent to the customer. The general flow of items through fulfillment center 100 is indicated using arrows. Specifically, in the illustrated embodiment, items 10 may be received from one or more suppliers, such as manufacturers, distributors, wholesalers, etc. at receiving area 120. In various embodiments, items 10 may include merchandise, commodities, perishables, or any suitable type of item depending on the nature of the enterprise that operates fulfillment center 10. Upon being received from a supplier at receiving area 120, items 10 may be prepared for storage. For example, in some embodiments items 10 may be unpacked or otherwise rearranged, and inventory management system 150 (which, as described below, may include one or more software applications executing on a computer system) may be updated to reflect the type, quantity, condition, cost or any other suitable parameters with respect to newly received items 10.

It is noted that items 10 may be stocked, managed or dispensed in terms of countable, individual units or multiples of units, such as packages, cartons, crates, pallets or other suitable aggregations. Alternatively, some items 10 such as bulk products, commodities, etc. may be stored in continuous or arbitrarily divisible amounts that may not be inherently organized into countable units. Such items 10 may be managed in terms of measurable quantities such as units of length, area, volume, weight, time duration or other dimensional properties characterized by units of measurement. Generally speaking, a quantity of an item 10 may refer to either a countable number of individual or aggregate units of an item 10 or a measurable amount of an item 10, as appropriate.

After arriving through receiving area 120, items 10 may be stored within storage area 130. Storage area 130 may generally include any suitable configuration of racks, bins, shelves, open areas and/or other facilities for holding items 10 after they have been received and prior to their being picked or otherwise removed from inventory. As described in greater detail below in conjunction with the descriptions of FIGS.

2-3, in some embodiments, the placement of various types of items 10 within storage area 130 may vary depending on patterns of anticipated demand for the items 10. For example, the distribution of a given item 10 within storage area 130 may depend at least in part on a rate or volume with which the given item 10 is expected to be picked, or on a similar metric such as an average expected holding time for the given item 10.

When a customer order specifying one or more of items 10 is received, the corresponding items 10 may be selected or "picked" from storage area 130. In various embodiments, item picking may range from minimally automated to completely automated picking, including any suitable combination of manual and automated processes. For example, in one embodiment fulfillment center employees may pick items 10 using written or electronic pick lists derived from customer orders, while in another embodiment conveyor belts and robotics may be used to pick and transfer items 10. After the items 10 corresponding to a particular order are picked, they may be processed at packing/shipping area 140 for delivery to the customer. For example, items may be packaged for shipment to the customer using a common carrier, or simply bagged or otherwise prepared for direct transfer to a customer, e.g., at an order pickup counter. In some embodiments, further interaction with inventory management system 150 may occur when items 10 are picked from storage area 130 and/or processed at packing/shipping area 140, for example to update inventory records to reflect the removal of inventory, to record revenue for the sale or other transaction (e.g., lease, rental, exchange, etc.) and so forth.

It is noted that items 10 may be picked or selected from storage area 130 for reasons other than customer orders. For example, items 10 may be removed on account of damage, to be liquidated or otherwise disposed of, to be returned to a supplier, to be conveyed to a different fulfillment center 100, or for any other reason. In some embodiments, items 10 being picked for customer orders and for other reasons may be commingled in a manner transparent to the agent performing the picking, and subsequently sorted according to their intended destinations. It is further noted that a customer for a given order may be any entity that may place or request an order for one or more items, or have such an order placed or requested on its behalf. For example, a customer may be an individual or an organization. A customer may also be a virtual entity having a material input of some kind. For example, a customer may be a particular step or stage of a manufacturing, assembly or other type of process.

Inventory Zones

Often, different quantities of different items 10 may be stored within fulfillment center 100 at any given time. For example, two different items 10*a-b* may be respectively known or predicted to have relatively low and high rates of being picked from storage at any given time. Such rates or velocities may be inferred, e.g., from historical or predicted customer order volume for item 10*a-b*, and in some embodiments may take into account other factors that contribute to the likelihood of items 10*a-b* being picked. Relative to one another, item 10*a* may be said to be a "slower-moving" item, in that it has a lower picking rate, while item 10*b* with its higher picking rate may be said to be a "faster-moving" item. In some embodiments, the holding quantity of an item 10 stored within fulfillment center 100 may be proportional to the that item's expected picking rate, which may in some cases be directly proportional to or equivalent to the item's expected order or sales volume. Thus, for example, if orders for 10 units of item 10*a* and 1000 units of item 10*b* are expected during a given period of measurement or planning, and there is one opportunity for item restocking during the period, then in one embodiment holding quantities of 10 units of item 10*a* and 1000 units of item 10*b* may be stored within fulfillment center 100. In other embodiments, there may be more or fewer than one restocking opportunity for an item 10 during an inventory planning period, and the holding quantities for items 10 may be determined accordingly.

Additionally, other factors may be taken into account in determining the holding quantity for a given item 10, such as a margin to guard against unexpected fluctuations in demand (e.g., stockout margin), a margin accounting for spoilage or damage, or any other suitable factor. It is noted that in some embodiments, inventory quantity planning may take place at predetermined intervals of time, continuously, in response to inventory-related events (e.g., customer orders, inventory receipt, etc.), or according to any other suitable scheme or strategy. Depending on the planning strategy employed (e.g., whether performed at intervals or continuously), the holding quantity of an item 10 may represent the quantity of that item 10 to be held in storage at the beginning of a planning period, the average quantity held over a period of time (e.g., over the planning period or another measurement period), or another suitable metric. It is contemplated that, depending on the inventory planning strategy employed, the holding quantity of a given item 10 may vary over time. For example, if orders for given item 10 are cyclical or seasonal, the holding quantity of given item 10 may be increased during periods of increased demand and allowed to fall during periods of decreased demand.

In some embodiments, determining different holding quantities for different items 10 according to respective expected rates of item picking may improve overall utilization of storage resources within fulfillment center 100 relative to storing fixed quantities of items 10 irrespective of their expected picking rates. For example, such an approach may result in storage of larger quantities of faster-moving items 10 and smaller quantities of slower-moving items 10, thus devoting fewer storage resources (e.g., less shelf space) to items 10 that are not expected to be picked often.

However, determining dissimilar holding quantities for different items 10 may create difficulties in efficiently distributing items 10 throughout storage area 130 for picking. If the quantity of units of an item 10 in storage is large relative to the total area or volume of storage area 130, it may be possible to uniformly distribute the units throughout storage area 130 such that the average distance a given picker would have to move through storage area 130 to reach the location of a unit of the item 10 is small relative to the dimensions of storage area 130 (e.g., 10% of the length or width of storage area 130, or less). Generally speaking, to the extent that the average distance a given picker moves between selecting various ones of items 10 can be reduced, the efficiency of picking operations may be increased, since this may allow pickers to spend a greater proportion of their time picking items rather than moving within fulfillment center 100. Correspondingly, increased picking efficiency may increase the number of picking operations (e.g., for customer orders) that a given number of pickers may complete during a given period of time, thus increasing overall fulfillment center productivity.

By contrast, if a particular item 10 has an especially low picking rate, its holding quantity may be determined to be only a small number of units (e.g., as few as one unit). Even if these units are evenly distributed throughout storage area 130, the average distance a picker may have to move to reach a given unit may be a substantial fraction of the dimensions of storage area 130, compared to the previous case. For example, assuming uniform distribution of pickers within storage area 130, then depending on how units of particular item 10 are distributed within storage area 130, the average distance a picker might have to move to reach a unit of particular item 10 could be as much as 50-100% of the length or width of storage area 130. While the chances of picking the particular item 10 at any given time may be relatively low, there may be a number of items 10 in storage that each have small holding quantities. For example, inventory planning for a fulfillment center 100 may emphasize providing comprehensive inventory coverage of a number of "tail" items, or items not frequently picked or ordered, in order to improve the shopping experience for the customers who do seek such items. Correspondingly, at any given time there may be a substantial chance of picking some "tail" item 10 that requires a picker to move a considerable distance in order to retrieve that item 10. If other items 10 cannot be picked along the way, such an excursion may reduce picking efficiency.

Figure 2:
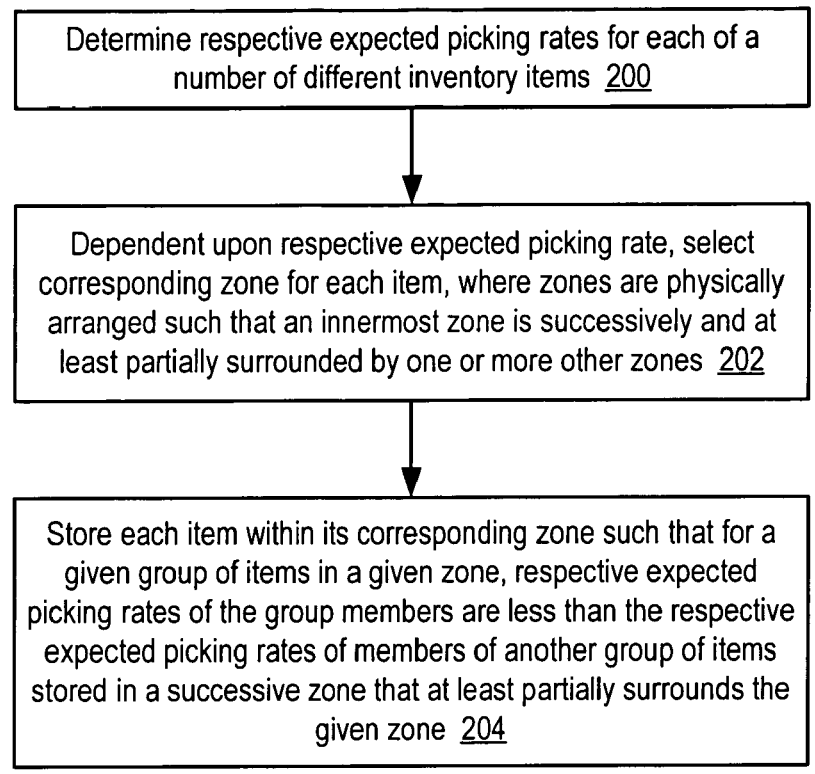
FIG. 2 is a flow diagram illustrating one embodiment of a method of storing inventory items.

In various embodiments, different items 10 having respective holding quantities that vary according to picking rates may be stored within storage area 130 in arrangements that may reduce the average distances pickers may have to move between item selections given the dissimilar quantities of items being picked. One embodiment of a method of storing such an arrangement of inventory items 10 is illustrated in FIG. 2. The illustrated method may be invoked under a variety of circumstances. For example, it may be invoked in an event-driven manner in response to the arrival of new inventory at fulfillment center 100, or it may be invoked periodically or continuously as stowers operate to replenish depleted inventory within storage area 130, as described in detail below in conjunction with the descriptions of FIGS. 6-7.

Operation of the illustrated method begins in block 200, where a respective expected picking rate is determined for each of a number of different inventory items 10. As described above, in some embodiments the expected picking rate for a given item 10 may be determined dependent on historical and/or predicted future picking behavior for given item 10, for example taking into account historical or expected customer orders for given item 10 and/or item spoilage, damage, repositioning or other factors that may affect the rate at which given item 10 is expected to be selected from within storage area 130. In some embodiments, the expected picking rate for a given item 10 may be determined dependent on data that pertains to a different item 10. For example, the picking rate for a given item 10 may be determined as a function, such as an average, of historical and/or expected behavior of one or more related items 10 that are similar to the given item 10 in some respect. As mentioned previously, a picking rate may be determined relative to an inventory planning period of time or as an instantaneous rate.

It is noted that in various embodiments, determination of a picking rate for a given item 10 may be subject to smoothing, averaging or other manipulation of item-related data. Additionally, in some embodiments, determination of a picking rate may be qualitative or categorical rather than strictly quantitative. For example, determining a picking rate for various ones of items 10 may include classifying individual items 10 into one of several discrete picking rate categories, such as "fast," "medium," and "slow." In one embodiment, such a qualitative classification may variously be performed by computing a quantitative picking rate (e.g., X units of a particular item picked per time period) and then classifying or binning the quantitative rate to a qualitative category through application of mapping rules (e.g., those items having quantitative picking rates in the range from Y to Z map to qualitative picking rate A). In other embodiments, qualitative picking rate determination may be performed without first computing and converting a quantitative value.

Dependent upon each item's expected picking rate, a corresponding one of a number of zones within storage area 130 may be selected for each of the items 10 (block 202). As described in greater detail below in conjunction with the descriptions of FIGS. 3 and 8A-D, in some embodiments, the zones may be physically arranged within storage area 130 such that a first, innermost zone is successively and at least partially surrounded by one or more other zones. It is noted that a given zone may be selected for more than one item 10.

Each of the items 10 may then be stored within its corresponding zone, such that for a given group of items 10 in a given zone, the respective expected picking rates of the group members are less than the respective expected picking rates of members of another group of items 10 stored in a successive zone that at least partially surrounds the given zone (block 204). Put another way, the items 10 may be stored within the zones such that the zones are physically ordered from the innermost zone to outer zones. Further, the items 10 may be stored such that respective qualitative or quantitative picking rates associated with each zone are in monotonically nondecreasing order progressing from any inner zone to any successive zone that at least partially surrounds the inner zone.

Figure 3:
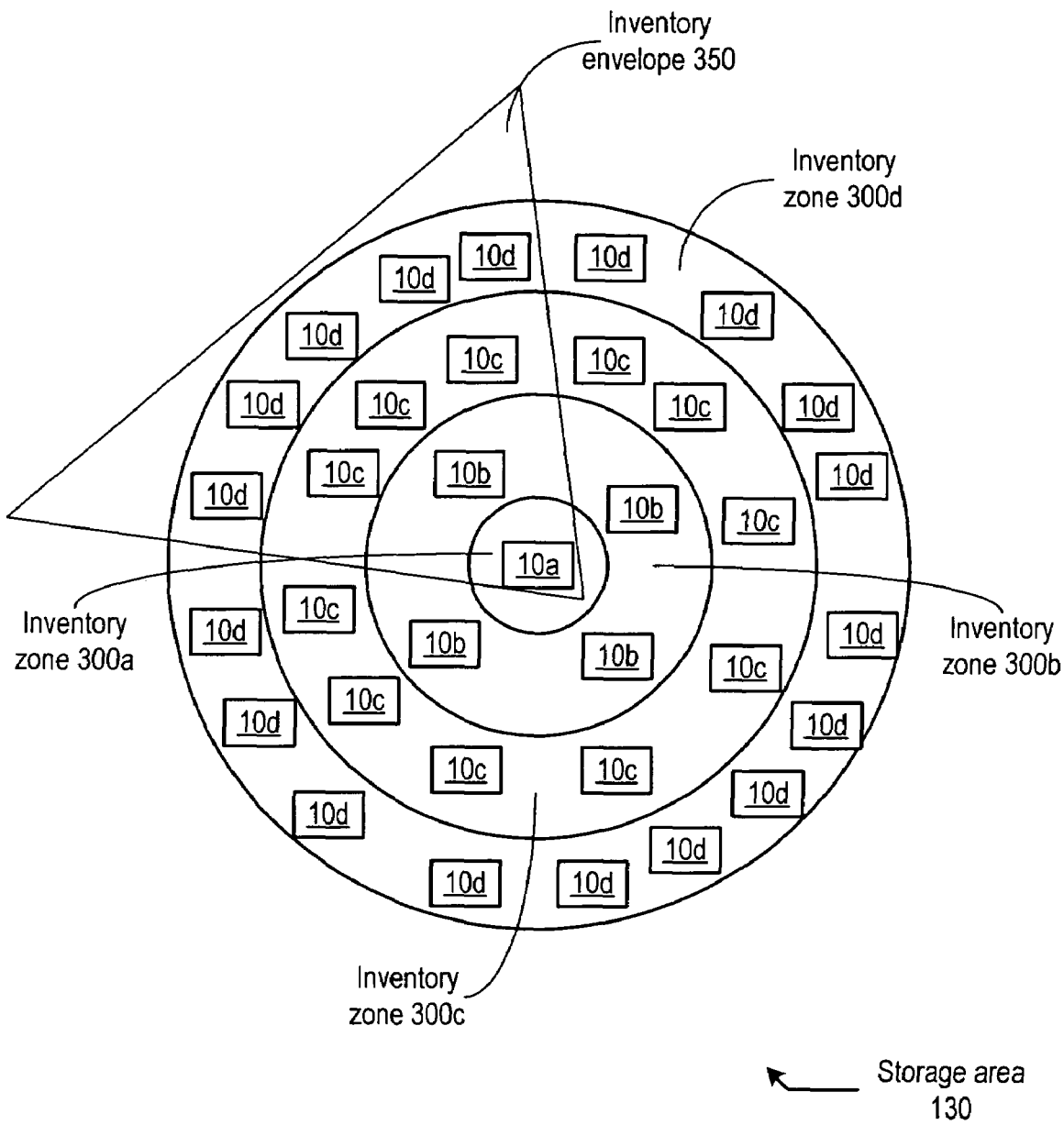
FIG. 3 is a block diagram illustrating one embodiment of a zone-based inventory distribution.

One exemplary embodiment of an inventory distribution that may be produced by the operation of the method of FIG. 2 is illustrated in FIG. 3. In the illustrated embodiment, storage area 130 may include four inventory zones 300a-d. Zone 300a denotes the innermost zone, and in the illustrated embodiment, each successive zone 300b-d completely surrounds the previous zone, although as described in greater detail below in conjunction with the descriptions of FIGS. 8A-D, in some embodiments successive zones may only partially surround inner zones. In FIG. 3, one unit of an item 10a is shown stored within zone 300a, four units of an item 10b are stored within zone 300b, eleven units of an item 10c are stored within zone 300c, and 18 units of an item 10d are stored within zone 300d. It is noted that in other embodiments, different numbers of zones 300 may be provided and different number of units and types of items 10 may be stored within each zone 300. Also, while circular zones 300 are shown in FIG. 3 to facilitate exposition, in other embodiments zones may have other topological configurations, such as elliptical or rectilinear configurations, for example. It is noted that a circular topology of zones 300 may be considered a special case of an elliptical topology.

In one embodiment, zones 300a-d may be associated with respective categories of item picking rates. In some embodiments, as described above, such categories may be qualitative, for example ranging among "slow," "moderate," "fast," and "very fast" for zones 300a-d, respectively. In other embodiments, each category may correspond to a range of quantitative picking rates such that items 10 stored within a given zone 300 have expected picking rates falling within the range. In one such embodiment, the ranges may be strictly nonoverlapping, such that the upper range bound of given zone 300 is less than the lower range bound of any surrounding zone 300. In another such embodiment, the ranges may be probabilistically nonoverlapping, such that any given item 10 within a given zone 300 is probabilistically likely to within a given threshold (e.g., 90%) of having an expected picking rate within the range corresponding to given zone 300. In embodiments having zones 300 with probabilistically nonoverlapping ranges of picking rates, it may be possible for a given zone 300 to include an item 10 that does not fall within the range of given zone 300.

An inventory envelope 350 is also shown in FIG. 3. Generally speaking, envelope 350 may be configured as a closed, connected region that encompasses at least a portion of each of the zones 300 included within storage area 130. In one embodiment, envelope 350 may be constrained to encompass less than the entirety of storage area 130. Depending on the uniformity and granularity with which items 10 are distributed within zones 300 and the size of envelope 350, envelope 350 may be configured to have the property that, prior to picking any items 10 within envelope 350, at least one unit of each item 10 stored within storage area 130 may be located somewhere within envelope 350. That is, subsequent to storing items 10 according to the method of FIG. 2, then even when constrained to a subset of the area of storage area 130, envelope 350 may represent a complete set of the types of items 10 stored within-storage area 130, including units of those items 10 with the slowest and fastest picking rates as well as those items 10 falling in between these extremes. In one embodiment, subsequent to storing items 10 according to the method of FIG. 2, any two different envelopes 350 that may be constructed to encompass at least a portion of each of zones 300 may be isomorphic with respect to the types of items 10 stored within each envelope 350. That is, each envelope 350 may include at least one unit of each item 10 stored within storage area 130. In some embodiments, envelope 350 may be configured so as to be a probabilistically complete set of items 10 stored within storage area 130. That is, envelope 350 may be configured such that within at least a threshold of probability (e.g., 98%), any given item 10 stored within storage area 130 may be found within envelope 350.

The actual number of units of a given item 10 within envelope 350 at a given time may vary according to item picking and restocking behavior. In some embodiments, a target number of units of a given item 10 to be maintained within envelope 350 may be determined dependent upon an expected picking rate for the given item 10 and an expected amount of "dwell time" pickers are expected to remain within envelope 350. For example, if an expected picking rate for a given item 10 is 20 units per hour and the dwell time of the envelope 350 is four hours, then 80 units may be the target number of units of the given item 10 to be stored within envelope 350 in order to maintain the isomorphy property mentioned above. That is, storage of 80 units of the given item 10 may be sufficient to ensure, within the level of certainty of the picking rate and dwell time, that units of given item 10 will be available within envelope 350 when needed.

Additionally, the target value of a given item 10 (e.g., determined according to its expected picking rate and expected picker dwell time as described above) may be employed to determine in which zone 300 the given item 10 should generally be placed. In one embodiment, threshold values may be assigned to various ones of zones 300, and units of given item 10 may be placed according to the relationship of its target value to the threshold values. For example, items 10 with target values of 10 or fewer units may be stored within innermost zone 300a, while threshold ranges for zones 300b-d may be 10-100 units, 100-500 units, and over 500 units, respectively. It is noted that these values are merely examples, and any suitable threshold values may be employed. Moreover, it is contemplated that in some embodiments, thresholds for zone placement of items 10 may be employed as heuristics or suggestions rather than strict requirements. In such embodiments, the thresholds for various zones 300 may be partially overlapping with respect to some items 10, rather than strictly disjoint.

As described above, ordered distinctions in expected picking rates may exist for items 10 stored in different zones 300.

That is, in certain embodiments the relationship among the expected picking rates of two different items 10 located in different zones 300 may generally be expected to correspond to the physical relationship between the zones 300. In some embodiments, however, there need not be any ordering or segregation of items 10 according to individual item picking rates within a single zone 300.

Additionally, the uniformity of distribution of units of an item 10 stored within a zone 300 may vary in various embodiments. While a precisely uniform distribution of units of an item 10 within a zone 300 (e.g., a distribution with constant separation distance between units) may be ideal in minimizing the average distance a picker may need to move to reach a given unit, it may be difficult to establish and maintain such a distribution. Correspondingly, in some embodiments, units of a given item 10 may be stored in as close to a uniform fashion as possible while accounting for the availability of free storage locations, the cost of storing given item 10 (e.g., the effort and time required to perform storing tasks), the expected picking rate of item 10, or any other relevant factors.

Similarly, the storage granularity or density of units of an item 10 stored within a zone 300 may vary in various embodiments. For example, if N units of a given item 10 are to be stored within a given zone 300, the most continuous distribution of the units may be obtained by uniformly storing them in N distinct locations within given zone 300. However, as both N and the size of given zone 300 increase, the effort and cost of storing each unit in a distinct location may also increase. Correspondingly, in some embodiments units of an item 10 may be stored in groups, where each group is stored in a distinct location within a zone 300 and where the number of groups is smaller than the number of units to be stored.

In one embodiment, the decision as to whether to store units of a given item 10 individually or in groups may depend on whether the number of units to be stored exceeds a threshold value. For example, if the N units to be stored exceeds a threshold value M, the N units may be divided into M groups of approximately N/M units for storage. In some embodiments, the threshold value M may vary for different zones 300. Additionally, in some embodiments, the manner in which items 10 are grouped may vary for different types of items 10. For example, the decision as to whether and how to group units of a given item 10 for storage may depend on how units of given item 10 are packaged (e.g., whether multiple units are packaged together in boxes, packages, crates, pallets, etc. upon arrival at fulfillment center 100), the physical characteristics of the units (e.g., dimensions, weight, shape), or other qualitative or quantitative characteristics of the units such as perishability, fragility, hazardousness, etc.

Figure 4:
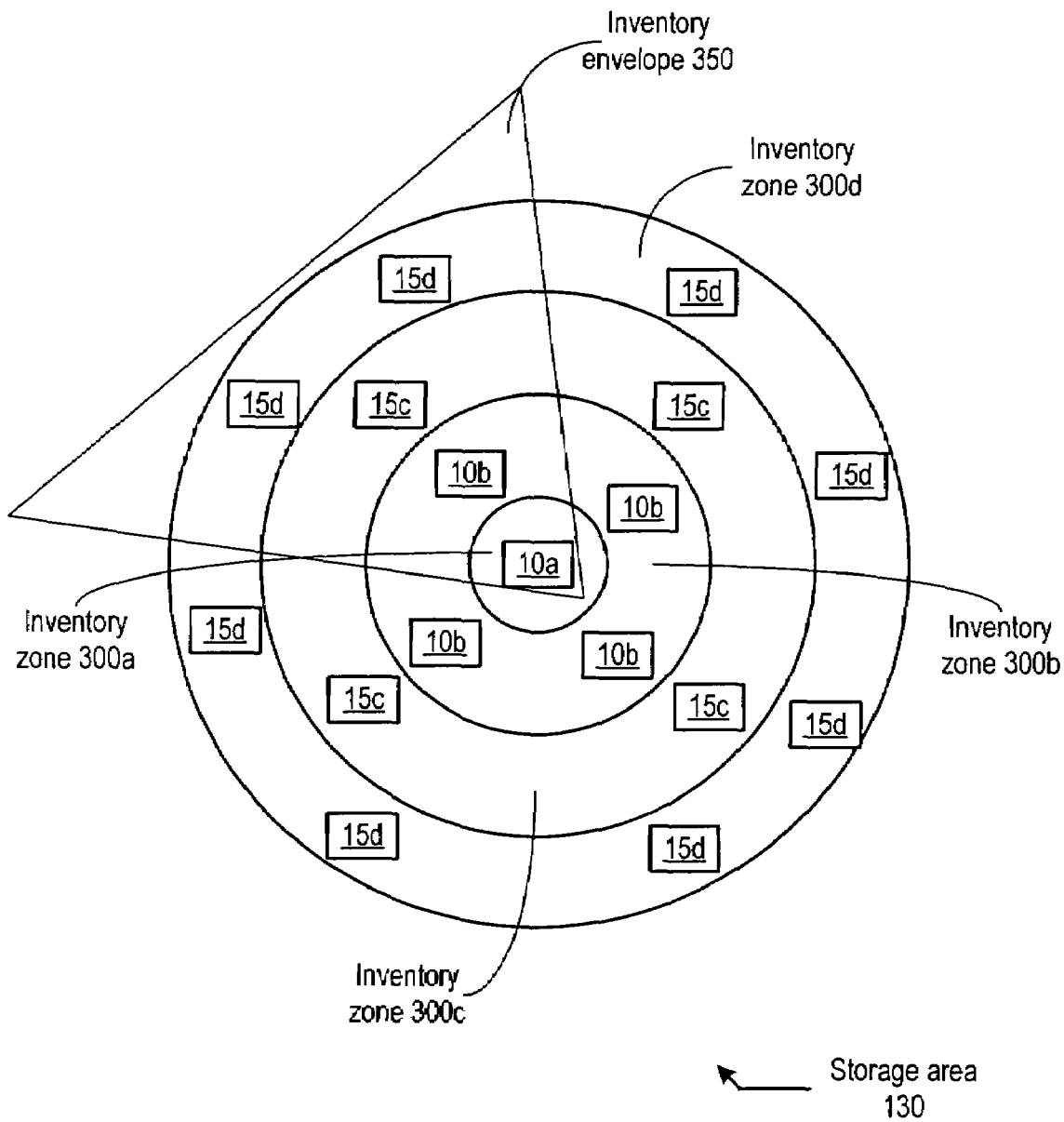
FIG. 4 is a block diagram illustrating another embodiment of a zone-based inventory distribution.

FIG. 4 illustrates an exemplary embodiment of storage area 130 in which units of certain items 10 are stored in groups rather than in respective distinct locations. Like the embodiment shown in FIG. 3, the illustrated embodiment includes four zones 300a-d, with one unit of item 10a in zone 300a and four units of item 10b in zone 300b. Unlike FIG. 3, however, zones 300c-d respectively include four groups 15c and eight groups 15d of items. For example, groups 15c-d may each include some number of units of respective items 10c-d. Like the distribution of units 10c-d shown in FIG. 3, the groups 15c-d of FIG. 4 are located in a relatively uniform fashion within their zones 300. However, the spacing between individual ones of groups 15c-d is larger than the spacing between units of items 10c-d, illustrating the possible tradeoff between a cost of storing items 10 and average picker movement distance to reach stored items 10 during picking operations. As in FIG. 3, in embodiments in which groups of item units are stored, inventory envelope 350 may be configured to encompass portions of each of zones 300 such that envelope 350 includes at least one unit of each different type of stored item 10.

Picking and Stowing Items in Inventory Zones

As described above with respect to FIGS. 2-4, given a distribution of items 10 within ordered zones 300 dependent upon expected item picking rates, an inventory envelope 350 may be configured to include at least a portion of each zone 300, such that the envelope 350 has the absolute or probabilistic property of including at least one unit of any given item 10 stored within storage area 130. In cases where the geometric area of envelope 350 is less than the area of storage area 130, then concentrating pickers within envelope 350 may reduce the average distance a picker may need to move to access a given item 10, since a complete or near-complete selection of items 10 may be found within a fraction of the total area of storage area 130.

Figure 5:
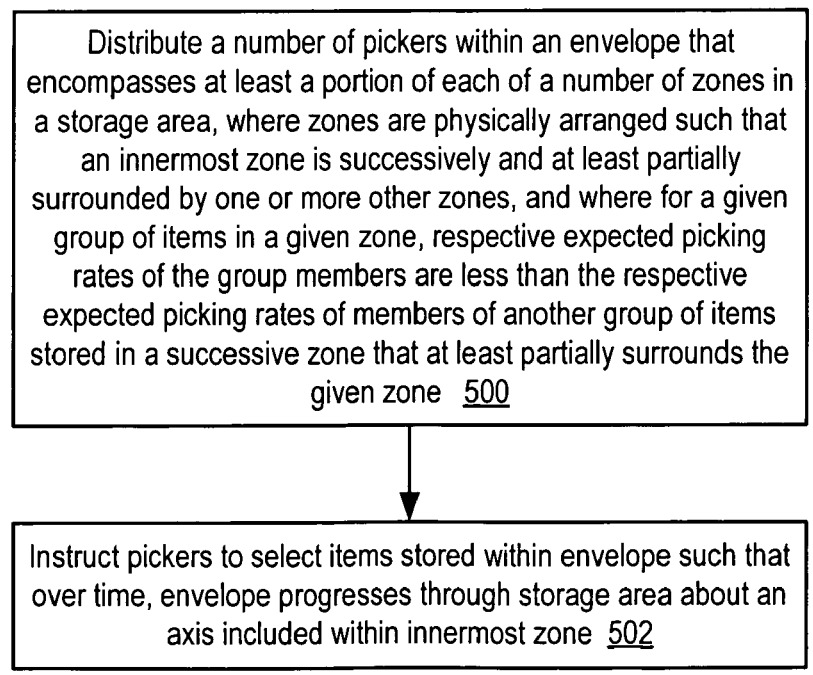
FIG. 5 is a flow diagram illustrating one embodiment of a method of picking items stored within a zone-based inventory distribution.

FIG. 5 illustrates one embodiment of a method of picking inventory items 10 from within a storage area 130 where the items 10 have been stored in zones dependent on expected picking rates. Operation of the method begins in block 500, where a number of pickers are distributed within an envelope 350 of storage area 130. As described previously, envelope 350 may encompass at least a portion of each of zones 300, which may be physically arranged within said inventory storage area such that a first, innermost one of said zones 300 is successively and at least partially surrounded by one or more other ones of said plurality of zones 300. Further, respective expected picking rates of members of a given group of items 10 stored in a given zone 300 may be less than the respective expected picking rates of members of another group of items 10 stored in a successive zone 300 that at least partially surrounds given zone 300.

As mentioned above, in various embodiments pickers may be human agents with or without mechanical assistance as well as purely mechanical, automated agents. As described in greater detail below in conjunction with the description of FIG. 10, the distribution, movement and actions of pickers may be controlled and coordinated by virtue of a centralized or distributed control system that may be configured to communicate instructions to pickers via any suitable means, such as audibly, visually, electronically (using wired or wireless communications technologies), etc.

The method may further include instructing the pickers to select items 10 stored within envelope 350 such that over time, envelope 350 progresses through storage area 130 about an axis included within the first, innermost zone 300 (block 502). As pickers begin selecting items 10 from within the envelope 350, those items may become depleted. However, as can be seen from FIGS. 3 and 4, movement of envelope 350 about an axis included within zone 300a may result in envelope 350 encompassing fresh stores of items 10.

Figure 6:
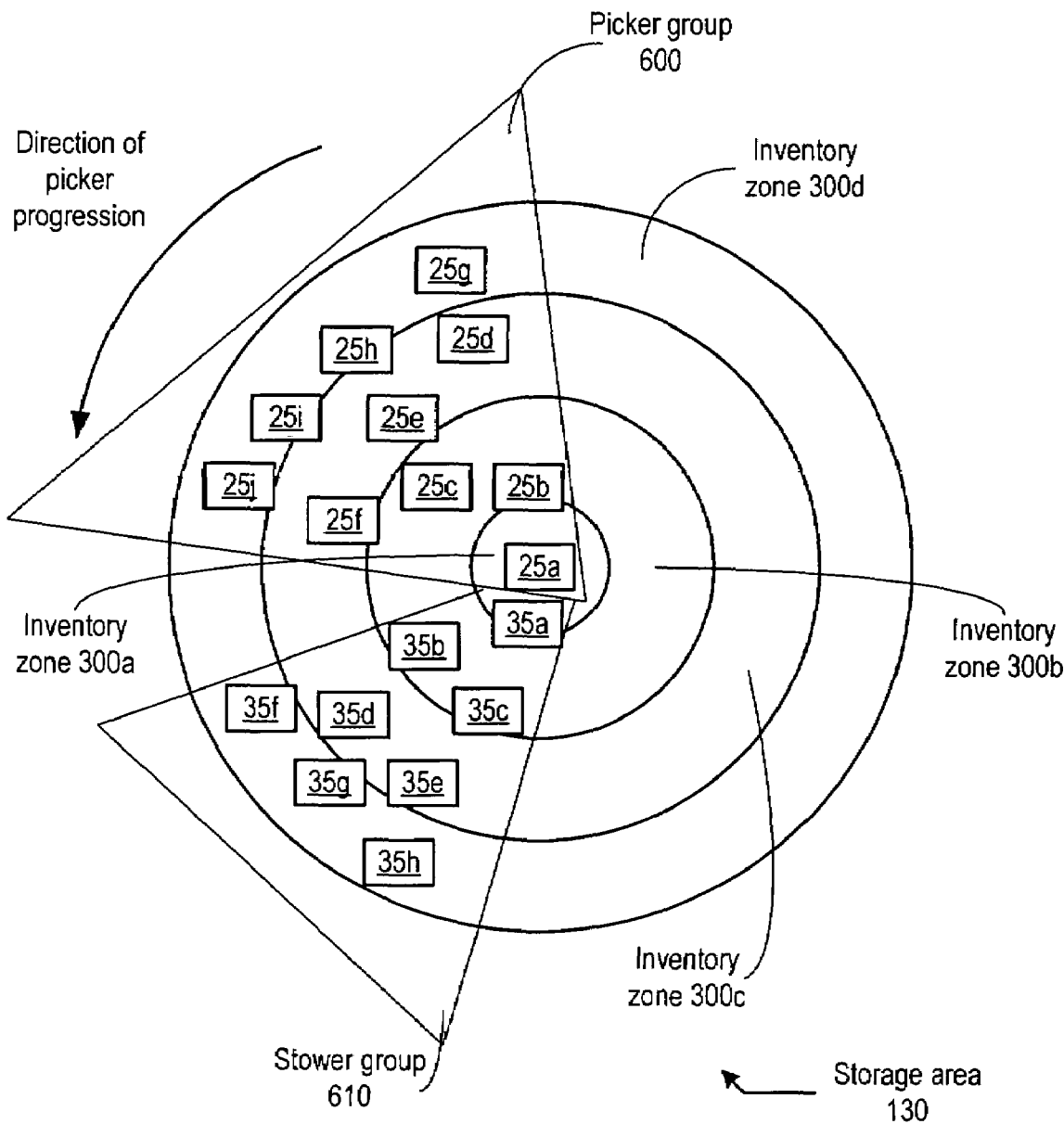
FIG. 6 is a block diagram illustrating one embodiment of concurrently-deployed pickers and stowers within a zone-based inventory distribution.

FIG. 6 illustrates one embodiment of storage area 130 showing an exemplary distribution of pickers according to the method of FIG. 5. Specifically, a picker group 600 including pickers 25a-j is shown distributed across zones 300a-d. For clarity, items 10 and groups 15 are omitted from FIG. 6, but it is understood that such items 10 and/or groups 15 may be distributed throughout zones 300 as described above. In one embodiment, the bounds of envelope 350 may be defined in terms of the locations of pickers 25. For example, an instance of envelope 350 may be considered to include at least the closed region that contains each of the pickers 25 belonging to a particular picker group 500. Correspondingly, movement of the envelope 350 may be effected by instructing particular movements of the pickers 25. For example, to effect a general counterclockwise motion of envelope 350, the movements of pickers 25 may be biased such that, on average, the pickers progress in a counterclockwise direction through zones 300. Such a bias may be implemented, for example, by more frequently instructing pickers 25 to make item selections that require them to move in directions that approximate counterclockwise movement of envelope 350, rather than in other directions. In other embodiments, movement of the envelope 350 may be effected by the manner in which items 10 are stored within storage area 130. For example, as described below, a group of stowers may place items in advance of a group of pickers 25, in anticipation of expected picking demand. Thus, the placement of the next available units of items 10 may tend to draw pickers in the desired direction of envelope movement.

It is noted that at any given time, a given picker 25 may move in any direction in order to fulfill an assigned picking operation. Thus, the instantaneous boundaries of envelope 350 including pickers 25 may be quite dynamic, fluctuating in manners that are not necessarily monotonic. However, over a larger period of measurement in terms of time or numbers of completed picking operations, the average motion of pickers 25 and envelope 350 may be a consistent axial progression through zones 300. In some embodiments, the movements of pickers 25 may be determined in an event-driven fashion. For example, pickers 25 may be instructed to move and/or carry out picking operations in response to specific events that require some sort of picking operation to occur (e.g., a customer order, detection of damaged items 10, or any other event that may precipitate item picking). In other embodiments, picker movement may be determined in a time-driven fashion. For example, pickers 25 may be instructed to move after a certain period of time has elapsed even if there is no specific picking operation to perform at that time. It is noted that in various embodiments, the movement of pickers 25 and envelope 350 may be relatively coarse- or fine-grained. For example, pickers 25 may remain within the same general area for a length of time and then be instructed to relocate en masse, such that over time envelope 350 appears to remain relatively fixed in position for intervals of time that are punctuated by discrete movements. Alternatively, envelope 350 may move more gradually and continuously over time as pickers 25 change their positions in smaller increments.

As described previously, in some embodiments, smaller numbers of units of slower-moving items 10 may be stored in inner zones 300, while larger numbers of units of faster-moving items 10 may be stored in outer zones 300. Also, by arranging zones successively around an innermost zone 300, then given relatively constant spacing of zones 300, the portion of a given zone 300 included within envelope 350 will encompass a greater area than a corresponding portion within envelope 350 of an inner zone 300 at least partially surrounded by the given zone 300. Correspondingly, in some embodiments fewer pickers 25 may be distributed within inner zones 300, while more pickers 25 may be located within outer zones 300. Such a distribution may be effective in approximating a uniform rate of picking operations per picker 25 and/or per unit of area within storage 130, which may assist in maximizing the productivity of a group of pickers 25. For example, in the embodiment of FIG. 6, the relative areas of the portions of zones 300a-d enclosed within the envelope defined by pickers 25 may be 1, 3, 5 and 7, respectively. Since items 10 within zone 300d may generally be expected to have higher picking rates than items 10 within zone 300a, more pickers 25 may be deployed within zone 300d than within zone 300a in order to reduce the variance in the rate of picking operations per picker 25, or per unit area within storage area 130.

It is contemplated that in some embodiments, the relative sizes of zones 300 may also be adjusted in order to tune the productivity level of pickers 25 and/or the rate at which the zones 300 within envelope 350 are depleted. For example, if zone 300b is depleted before zone 300d, pickers 25 within zone 300b may need to advance to a different portion of storage area 130 in order to find items 10 to satisfy pick requests. If pickers 25 within zone 300d do not also advance, envelope 350 may become distorted (e.g., less compact) and picker efficiency may correspondingly decrease. However, if pickers within zone 300d advance before zone 300d is depleted comparably to zone 300b, then storage area 130 may not be most efficiently utilized. Correspondingly, the relative sizes of zones 300 and the mix of items 10 stored therein may be tuned to balance the depletion rates within each zone 300, such that compactness of the envelope of pickers 25 may be preserved as the envelope progresses, while the utilization of storage area 130 is relatively consistent.

It is noted that in some embodiments, pickers 25 need not be statically assigned to particular zones 300, and may in fact move anywhere within storage area 130 in response to picking instructions. For example, while pickers 25 may generally remain within a certain average distance from one another within envelope 350, excursions may still occur in which a given picker 25 moves a substantial distance away from other pickers 25, e.g., in response to an exceptional condition such as a high-priority customer order for an item 10 that for some reason is not readily available within envelope 350.

It is contemplated that both picking and storing of items, for example according to the respective methods of FIGS. 2 and 5, may occur concurrently within a single storage area 130. FIG. 6 illustrates one possible embodiment of such concurrent operation, in which a stower group 610 including a number of stowers 35a-h is shown distributed within zones 300. In one embodiment, stowers 35 may be distributed within an envelope 350 encompassing portions of each of zones 300. For example, as described above with respect to pickers 25, in some embodiments the envelope 350 in which stowers 35 are distributed may be defined in terms of the region bounding the locations of stowers 35. In other embodiments stowers 35 may collectively work within individual zones 300 or fewer than all zones 300 at one time.

Individual stowers 35 may be instructed to store, or "stow," units or groups of items 10 within zones 300 according to the method of FIG. 2. Thus, generally speaking, stowers 35 may operate to restore the ordered distribution of inventory items 10 following some degree of depletion caused by the picking operations carried out by pickers 25. In some embodiments, stowers 35 may be instructed to stow items 10 within their respective envelope 350 such that over time, their respective envelope progresses through storage area 130 about an axis included within the innermost zone 300. For example, stowers 35 may generally move axially through zones 300 in the same direction of pickers 25. In the illustrated embodiment, stowers 35 may precede or lead pickers 25 while progressing through storage area 130. In some embodiments, stowers 35 may be directed to stock portions of storage area 130 according to predicted or expected picking demand for items 10, in anticipation of pickers 25 entering the stocked area during the timeframe for which demand was predicted. This may allow item placement and picker movement to be adjusted dynamically in response to fluctuations in expected demand. For example, stowers 35 may stock a portion of storage area 130 under the assumption that pickers 25 will enter and begin picking within the stocked area within some number of hours or days.

In other embodiments, stowers 35 may follow or lag pickers 25 while progressing through storage area 130, effectively operating in the "wake" of pickers 25 to replenish picked items 10. It is contemplated that in alternative embodiments, individual agents may operate as pickers 25 with respect to certain items 10 and stowers 35 with respect to other items 10. Thus, for example, a given agent may both pick and stow items while progressing through storage area 130. Also, while counterclockwise movement of pickers 25 and stowers 35 is shown in FIG. 6, it is contemplated that in other embodiments, pickers and stowers may move in a clockwise direction or may move in another pattern, such as an oscillatory pattern as described below.

Figure 7:
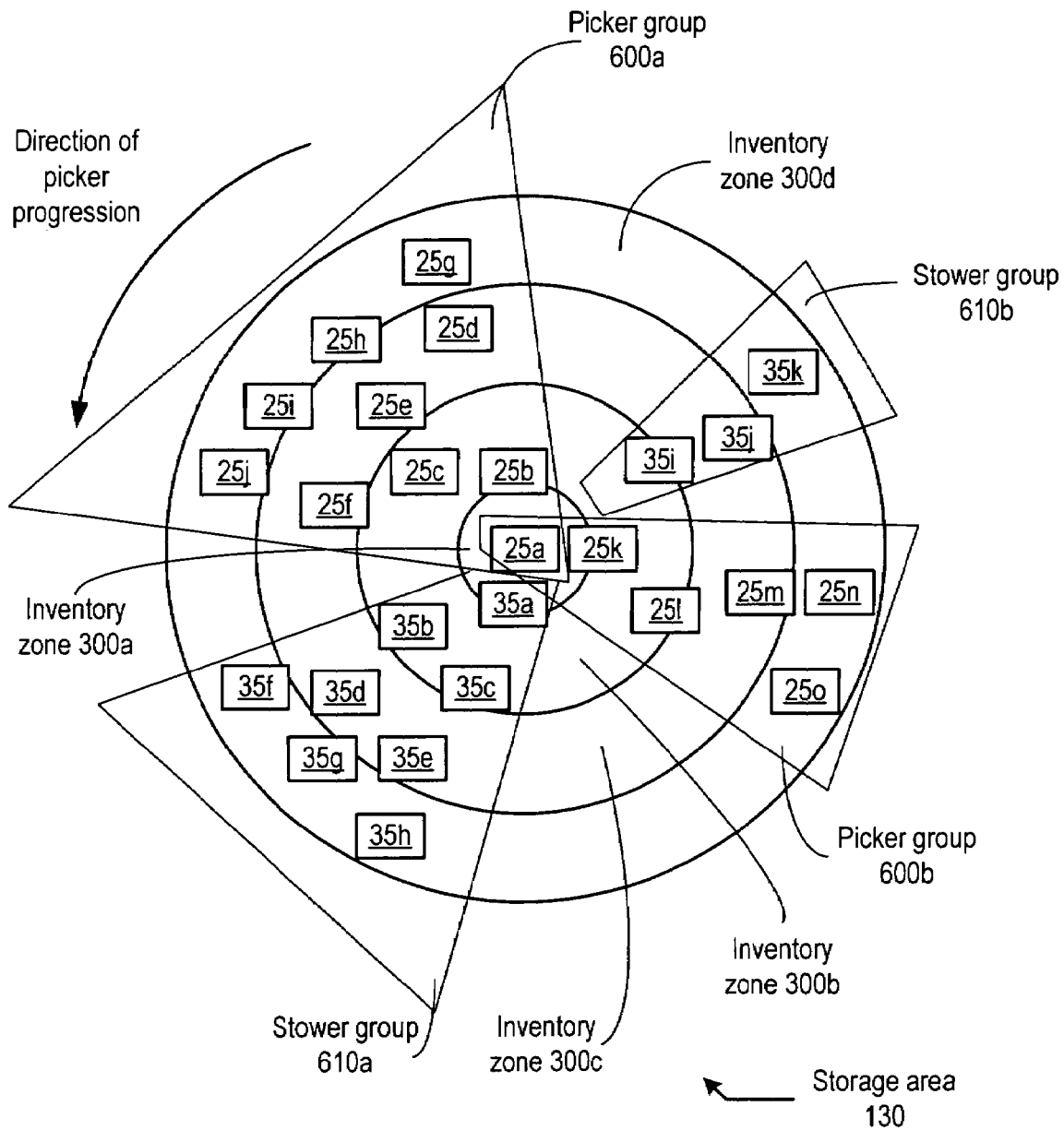
FIG. 7 is a block diagram illustrating another embodiment of concurrently-deployed pickers and stowers within a zone-based inventory distribution.

In some embodiments, it is contemplated that multiple groups of pickers 25 and/or stowers 35 may be deployed within portions of storage area 130 to perform picking and/or stowing of items 10 as described above. FIG. 7 illustrates one embodiment in which two picker groups 600a-b are shown distributed within respective envelopes of zones 300. Two stower groups 610a-b are also shown. It is noted that not all groups of pickers 25 or stowers 35 need include the same number agents, and different groups may be distributed differently within their respective envelopes. Further, the number of stower groups 610 need not equal the number of picker groups 600. In some embodiments, the throughput or total productivity of storage area 130 in terms of picking and/or stowing operations may be more readily adjusted by adding additional groups of pickers 25 and/or stowers 35 operating within distinct areas of storage area 130, rather than by enlarging existing groups. For example, in some instances pickers 25 divided into two distinct envelopes within storage area 130 may be less likely to interfere with one another or may otherwise present a simpler control problem than the same number of pickers 25 distributed within in a single envelope.

Figure 8A:
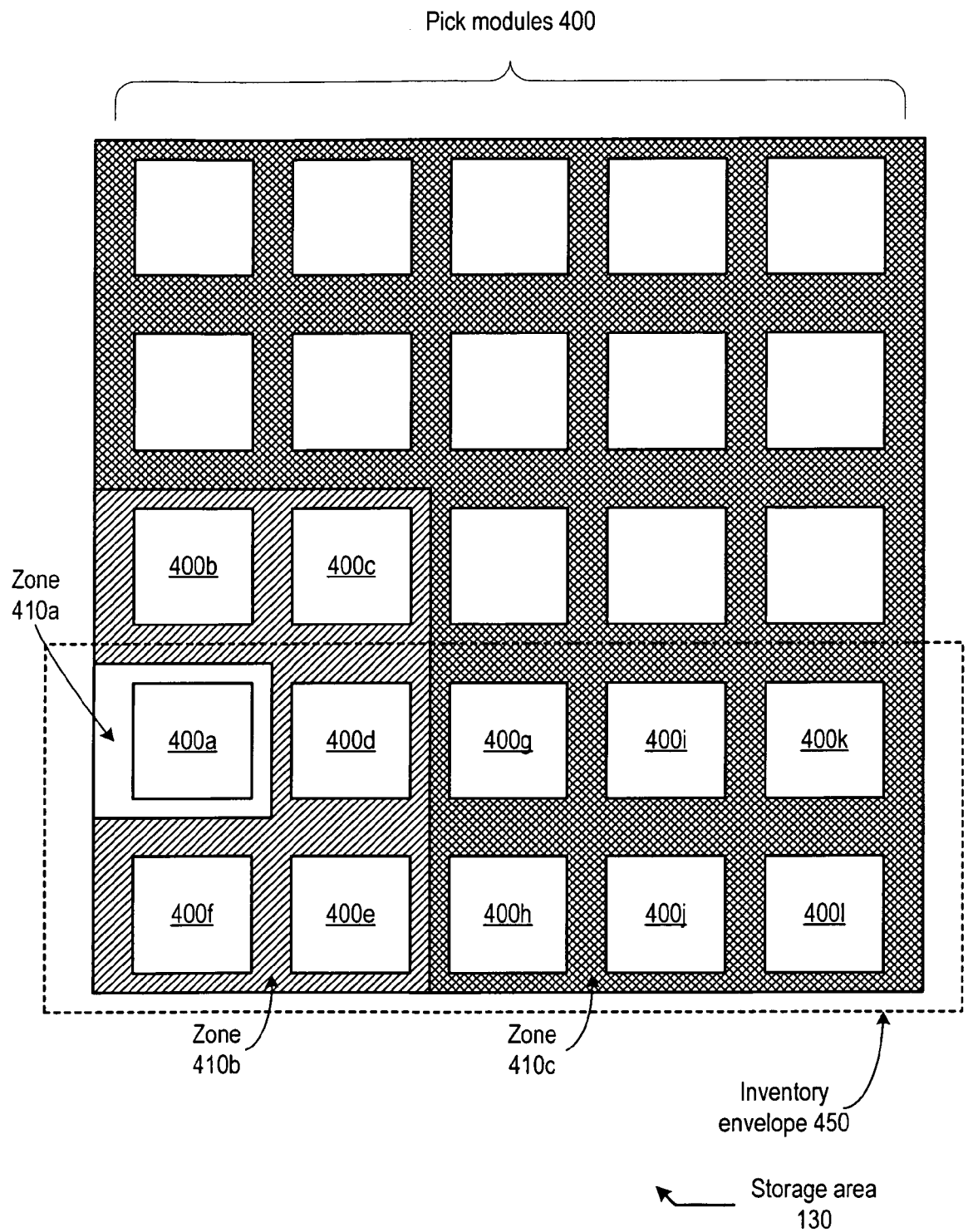
FIGS. 8A-D illustrate one embodiment of a rectilinear distribution of inventory zones as well as exemplary envelope movement across such a distribution of zones.
Figure 8B:
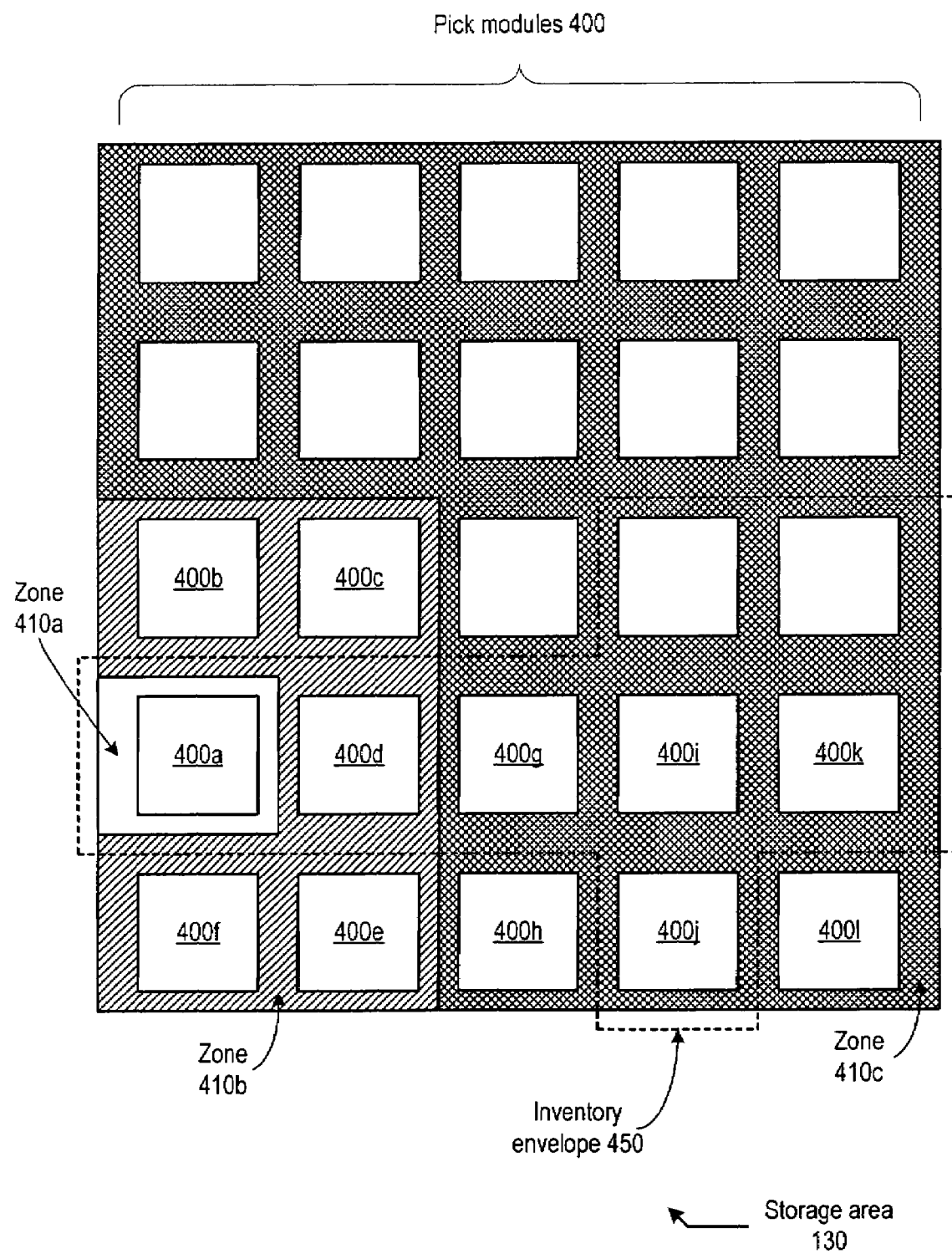
Figure 8C:
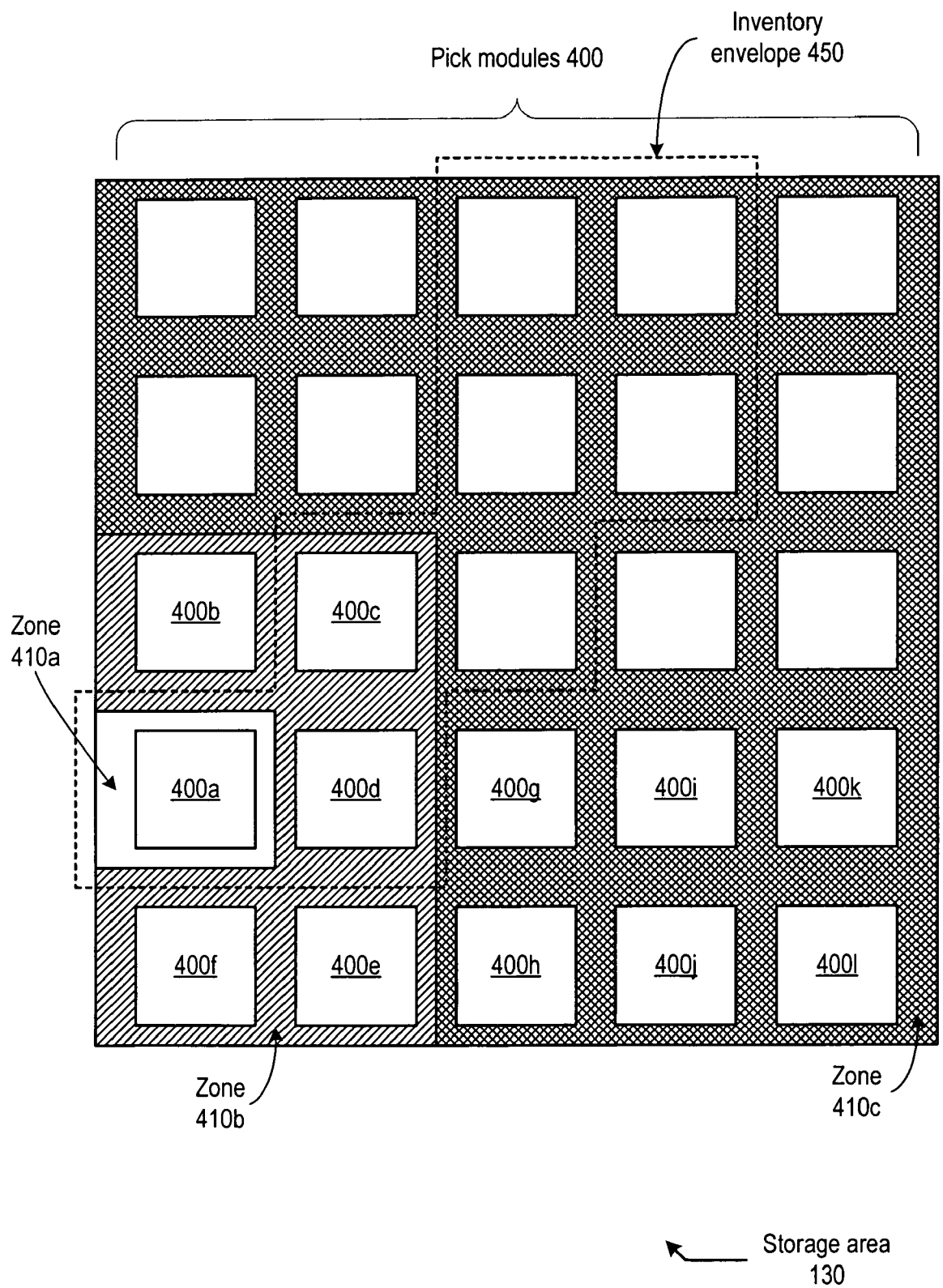
Figure 8D:
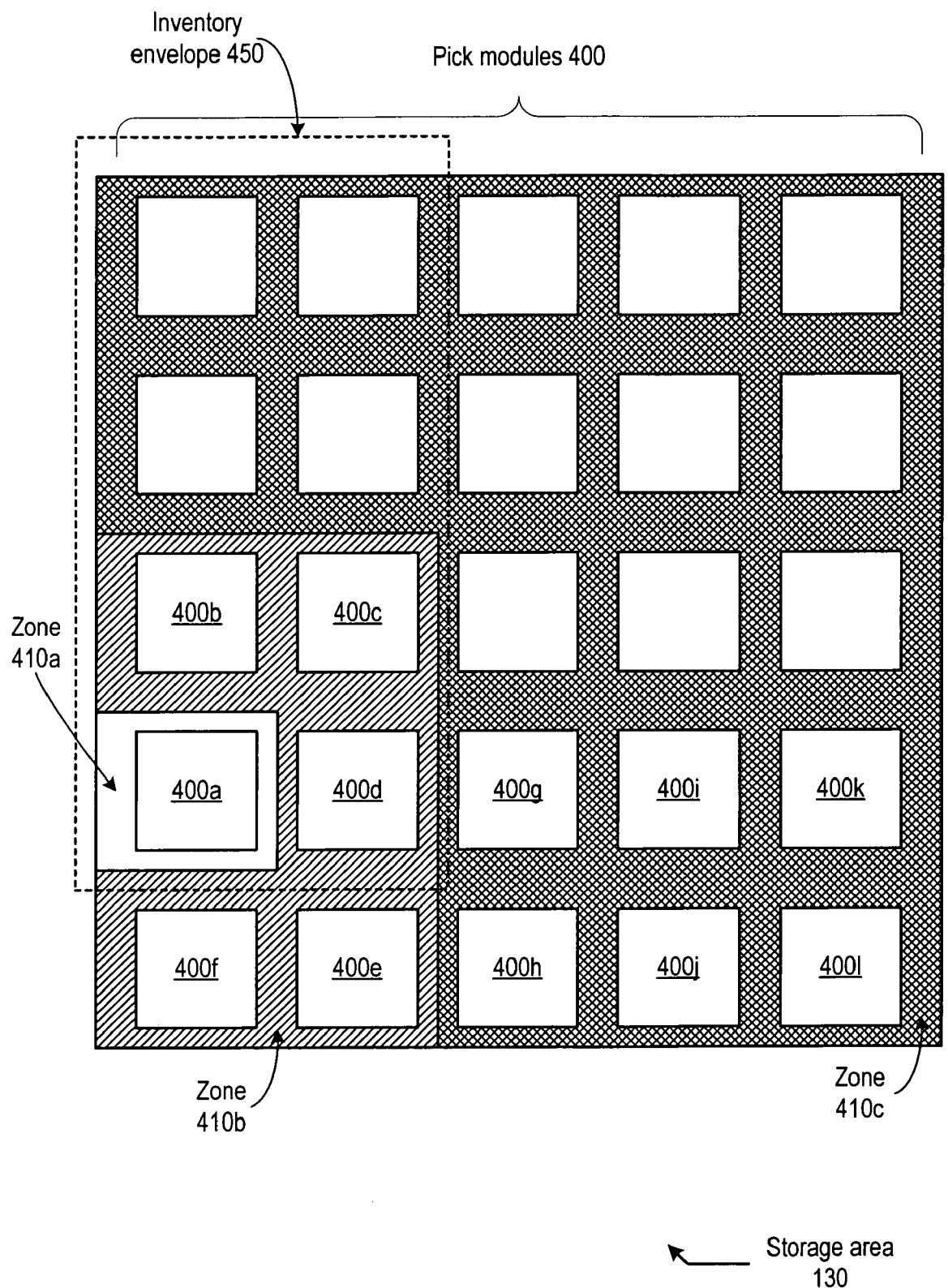

In the foregoing discussion, circular embodiments of inventory zones and envelope movement have been illustrated to facilitate exposition. However, as mentioned previously, any suitable topology may be employed. One exemplary embodiment of a rectilinear organization of inventory zones is illustrated in FIG. 8A. In the illustrated embodiment, a rectilinear array of pick modules 400 is shown deployed within storage area 130. Generally speaking, a pick module 400 may be any suitable structure configurable for storing inventory items 10. In various embodiments, pick modules 400 may include fixed or removable bins, racks, shelves, compartments, or other facilities for item storage. The specific configuration of individual pick modules 400 may vary. For example, different pick modules 400 may be configured for storage of different sizes or types of items 10. In some embodiments, pick modules 400 may be dynamically reconfigured, for example by pickers or stowers. Pick modules 400 may be accessible from only one or from multiple different orientations, and may be distributed throughout storage area 130 separated by spaces, such as aisles, through which pickers and stowers may move in order to access particular modules 400. While a uniform distribution of pick modules 400 is shown, in other embodiments module distribution and spacing may vary.

In the illustrated embodiment, three distinct zones 410a-c are shown. The innermost zone 410a includes pick module 400a, located at the edge of storage area 130. Zone 410b partially surrounds zone 410a and includes pick modules 400b-f. Zone 410c partially surrounds zone 410b and includes the remaining illustrated pick modules 400. It is noted that innermost zone 410a need not be located within the interior of storage area 130, nor need it be completely surrounded by successive zones 410. Inventory items 10 may be stored within zones 410 according to the method of FIG. 2, such that zones 410a-c respectively include items 10 having low, intermediate and high expected picking rates.

FIG. 8A also shows one embodiment of inventory envelope 450, which is configured to encompass at least a portion of each of zones 410a-c. Specifically, as shown, envelope 450 includes pick modules 400a and 400d-l. Similar to the embodiments of FIGS. 6-7, pickers may be distributed through envelope 450 and, according to the method of FIG. 5, instructed to select items 10 stored within the envelope 450 such that over time, envelope 450 proceeds through storage area 130 about an axis included within zone 410a. For clarity, pickers are not explicitly shown among pick modules 400 in FIG. 8A.

Collectively, FIGS. 8A-D illustrate one example of how envelope 450 may move through storage area 130 as picking progresses. It is noted that in some embodiments, axial movement about zone 410a may be approximated by a series of rectilinear picker movements through zones 410. That is, even though the arrangement of modules 400 may limit the possible movements of a given picker to, e.g., two orthogonal directions, on the scale of storage area 130 as a whole, such movements may be coordinated to approximate rotation of envelope 450 about an axis included within zone 410a. It is noted that axial envelope movement need not be continuously unidirectional. In an embodiment such as that illustrated in FIGS. 8A-D, envelope 450 may oscillate between bounds defined by the edges of storage area 130, for example proceeding from the orientation of FIG. 8D back to the orientation of FIG. 8A.

Similar to the embodiment described above with respect to FIG. 6, stowing of items 10 may occur in the wake of the picking envelope 450. In cases where envelope 450 oscillates in direction, stowers may vacate storage area 130 when envelope 450 changes direction to avoid occupying the same region of storage area 130 at the same time. Alternatively, stowers and pickers may temporarily overlap from time to time.

Figure 9:
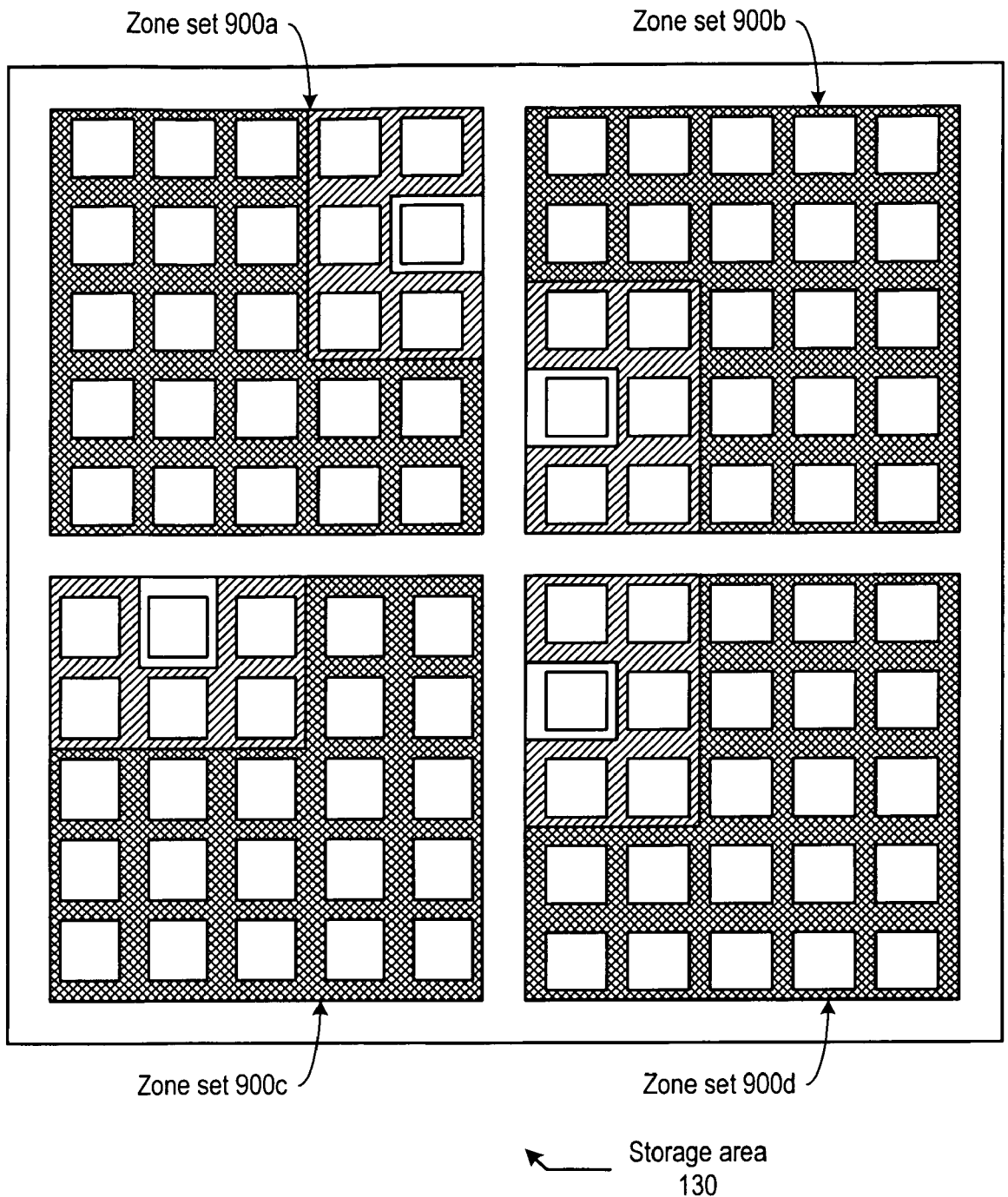
FIG. 9 is a block diagram illustrating one embodiment of replication of a set of inventory zones within an inventory storage facility.

In some embodiments, more than one set of zones 410 may be defined within storage area 130, where each set of zones 410 may include a respective innermost zone 400 and may include one or more envelopes 450 configured to move about an axis included within the innermost zone 410, and where the envelopes of different sets of zones 410 may be managed independently of one another. For example, instead of being extended to encompass an entire storage area 130, the general configuration of zones shown in FIG. 2 or 8A may be replicated a number of times within storage area 130. One embodiment illustrating such replication is shown in FIG. 9, where the arrangement of FIG. 8A showing pick modules 400 organized into three zones 410a-c is replicated four times into four distinct zone sets 900a-d. While not specifically shown in FIG. 9, each zone set 900 may include an envelope of picking activity similar to envelope 450 shown in FIGS. 8A-D. It is noted that the types and quantities of items 10 stored in various ones of zone sets 900 may differ, and that each of zone sets 900 may be tuned specifically to the expected picking rates of the items 10 stored in a particular zone set 900. That is, envelopes of pickers and stowers may operate differently across different zone sets 900. In a manner analogous to deploying different zone sets 900 within a single fulfillment center 100, it is contemplated that independent sets of zones 410 may be deployed within different fulfillment centers 100 and tuned to the specific characteristics of items 10 stored therein.

Figure 10:
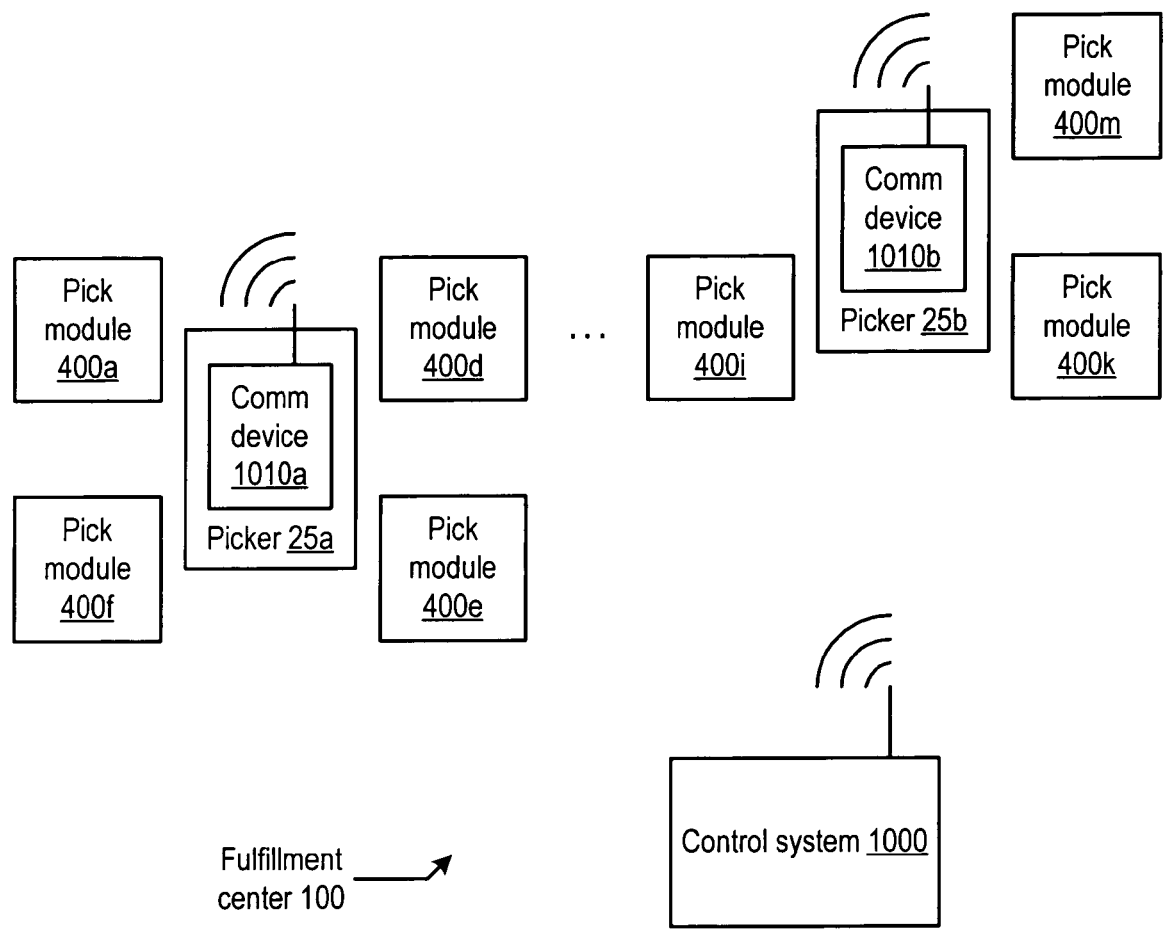
FIG. 10 is a block diagram illustrating one embodiment of a control system configured to communicate with pickers and/or stowers within an inventory storage facility.

As mentioned previously, in some embodiments the actions of various agents acting as pickers and/or stowers may be coordinated by a control system configured to communicate instructions to the agents. One embodiment of such a system is illustrated in FIG. 10, where a portion of the pick modules 400 shown in FIG. 8A is expanded to show two pickers 25a-b situated among the pick modules 400. Each picker 25a-b has a corresponding communication device 1010a-b with which the picker may interact, and which may communicate with a control system 1000. In various embodiments, communication device 1010 may be a handheld device, a device worn by or attached to picker 25, or a device integrated into or mounted on an apparatus used by or comprising part of picker 25, such as a push cart, for example. (In some embodiments, stowers 35 may similarly have corresponding communication devices 1010 configured as described below.)

Communication device 1010 may be configured to convey instructions to a picker 25 as to what actions to perform within storage area 130. For example, in one embodiment communication device 1010 may receive from control system 1000 a list of items 10 to be picked from a particular set of pick modules 400, and may present the items to pick and the pick modules 400 to picker 25 via a display portion of the device such as a screen. In response to receiving instructions to pick various items, picker 25 may move to the first indicated pick module 400 (or, alternatively, to the closest indicated pick module 400 if the indicated pick modules 400 are not specifically ordered by the control system). Once at an indicated pick module 400, picker 25 may select a unit of an indicated item 10 from the indicated pick module 400. For example, picker 25 may retrieve an item from a bin, pallet, chute, or other configuration of pick module 400. In some cases, picker 25 may also inspect the condition of the item, and may select an item only if it is in suitable condition (e.g., is clean, undamaged, unopened, or satisfies some other set of criteria).

Once an item 10 has been selected, picker 25 may notify control system 1000 via communication device 1010 of completion of the picking operation for that item. For example, the selected item 10 may include a bar code, radio frequency identification (RFID) tag, or other type of identifier that may be scanned by communication device 1010. Alternatively, picker 25 may manually enter an identifier into communication device 1010 or mark an indicated item 10 as having been picked.

It is noted that numerous different embodiments of communication device 1010 are possible and contemplated. In some embodiments, communication device 1010 may include a portable general-purpose computer system configured to execute an operating system and one or more applications, while in other embodiments, communication device 1010 may include an embedded computer system configured to execute customized software applications. In various embodiments, communication device 1010 may support numerous different interface mechanisms, such as video displays of various sizes and resolutions, audio input/output capabilities (e.g., for voice communication), optical (e.g., bar code) scanning devices, RFID detectors, wireless or wired network interfaces, or various combinations of these, which may be directly integrated within communication device 1010 or implemented by separate devices interfaced with communication device 1010. In some embodiments, communication device 1010 may not include general-purpose-computer-related functionality, but may instead include a simple voice interface with a dispatcher or control system (e.g., a one-way or two-way radio or a wireless or cellular phone). Communication device 1010 may generally be configured to communicate with control system 1000 via any suitable communication technology, such as a wired or wireless data networking protocol (e.g., Ethernet or Wi-Fi) or any suitable form of radio frequency communication, for example.

Exemplary Control System Hardware

It is contemplated that in some embodiments, any of the methods, techniques or components described above may be implemented as instructions and data capable of being stored by a computer-accessible storage medium. Such methods or techniques may include, for example and without limitation, the methods of instructing agents to store and pick inventory items 10 shown in FIGS. 2 and 5 and described in detail above, as well as suitable variations thereof. Such instructions may be executed to perform a particular computational function, such as performing inter-process communication, implementing mathematical functions for process control such as integration, differentiation, convolution, optimization, etc., as well as higher-order functions such as operating system functionality, network communications functionality, application functionality, and/or any other suitable functions. It is noted that for any method described above, where no specific ordering of operations of a method is described or required, the various operations of the method may be performed in any suitable order by instructions that may be executed in any suitable order.

Figure 11:
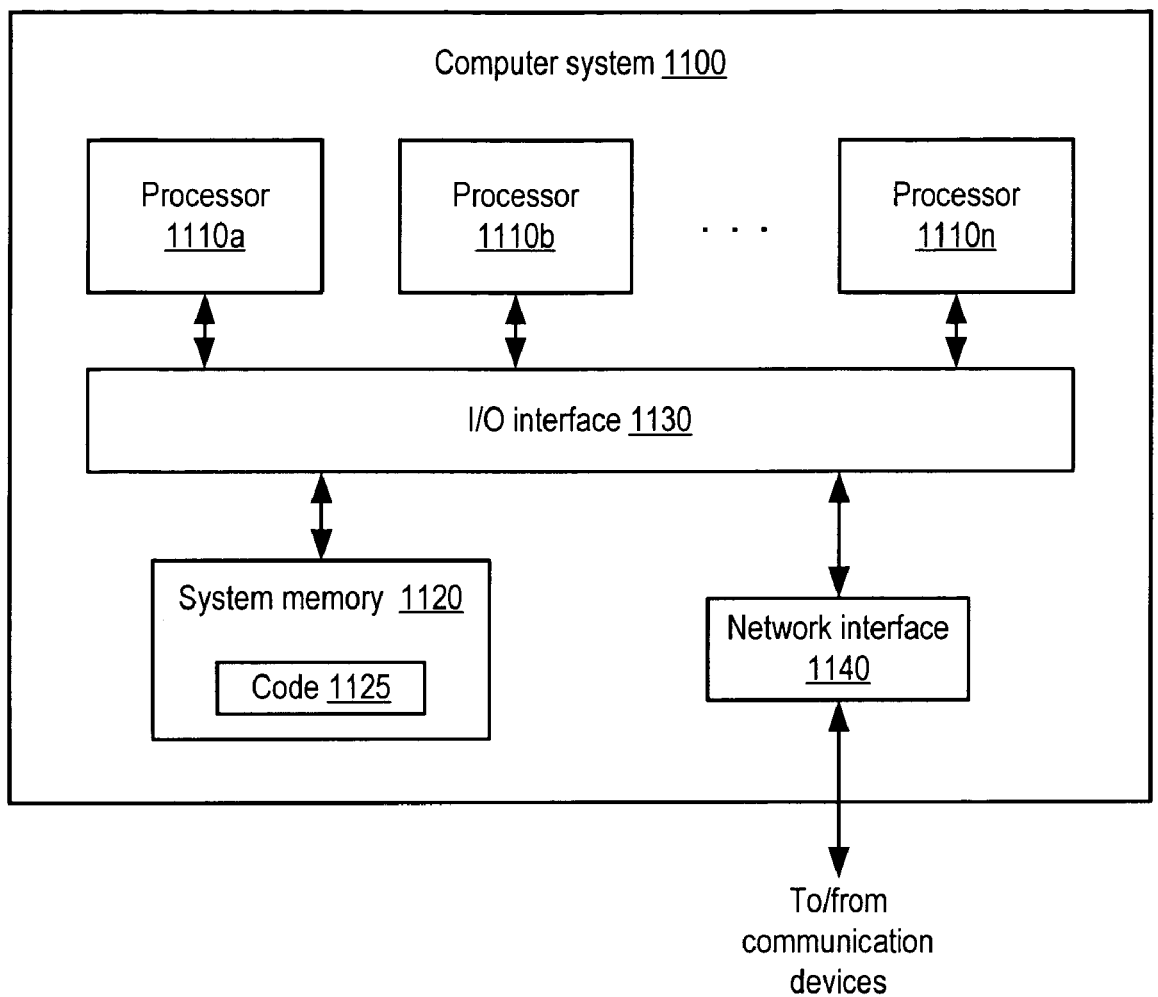
FIG. 11 is a block diagram illustrating an exemplary embodiment of a computer system.

Control system 1000, in one embodiment, may include a general-purpose computer system that includes or is configured to access one or more tangible, computer-accessible storage media, such as is illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. Generally speaking, one or more instances of computer system 1100, or a suitable variant thereof, may be configurable to implement any one or more of the functions of control system 1000, such as any of the methods or techniques described above, according to any suitable functional partitioning. In some embodiments, computer system 1100 may be illustrative of control system 1000, while in other embodiments control system 1000 may include other elements in addition to those of computer system 1100.

In various embodiments computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be a general-purpose or embedded processor implementing any of a variety of instruction set architectures (ISAs), such as the x86, PowerPC, SPARC, or MIPS ISAs, or any other suitable ISA. In multiprocessor systems, each of processors 1110 may commonly, but need not necessarily, implement the same ISA.

System memory 1120 may be configured to store instructions and data accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 1120 as code 1125. It is noted that in some embodiments, code 1125 may include instructions and data implementing desired functions that are not directly executable by processor 1110 but are represented or encoded in an abstract form that is translatable to instructions that are directly executable by processor 1110. For example, code 1125 may include instructions specified in an ISA that may be emulated by processor 1110, or by other code 1125 executable on processor 1110. Alternatively, code 1125 may include instructions, procedures or statements implemented in an abstract programming language that may be compiled or interpreted in the course of execution. As non-limiting examples, code 1125 may include code specified in a procedural or object-oriented programming language such as C or C++, a scripting language such as perl, a markup language such as HTML or XML, or any other suitable language.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to network 120, such as other computer systems, for example. In particular, network interface 1140 may be configured to allow communication between computer system 1100 and the various communication devices 1010 described above. Network interface 1140 may commonly support one or more wireless networking protocols (e.g., Wi-Fi/IEEE 802.11, or another wireless networking standard). However, in various embodiments, network interface 1140 may support communication via any suitable wired or wireless general data networks, such as other types of Ethernet network, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible storage medium configured to store instructions and data as described above. However, in other embodiments, instructions and/or data may be received, sent or stored upon different types of computer-accessible media. Generally speaking, a computer-accessible medium may include storage media or memory media such as magnetic or optical media, e.g., disk or CD/DVD-ROM coupled to computer system 1100 via I/O interface 1130. A computer-accessible medium may also include any volatile or non-volatile media such as RAM (e.g. SDRAM, DDR SDRAM, RDRAM, SRAM, etc.), ROM, etc, that may be included in some embodiments of computer system 1100 as system memory 1120 or another type of memory. A computer-accessible medium may generally be accessible via transmission media or signals such as electrical, electromagnetic, or digital signals, conveyed via a communication medium such as a network and/or a wireless link, such as may be implemented via network interface 1140.

In one embodiment, the relationship between control system 1000 and communication devices 1010 may be a server/client type of relationship. For example, control system 1000 may be configured as a server computer system 1100 that may convey instructions to and receive acknowledgements from communication devices 1010. In such an embodiment, communication devices 1010 may be relatively simple or "thin" client devices. For example, communication devices 1010 may be configured as dumb terminals with display, data entry and communications capabilities, but otherwise little computational functionality. However, it is contemplated that in some embodiments, communication devices 1010 may be computer systems configured similarly to computer system 1100, including one or more processors 1110 and various other devices (though in some embodiments, a computer system 1100 implementing a communication device 1010 may have somewhat different devices, or different classes of devices, compared to a computer system 1100 implementing control system 1000). It is further contemplated that in some embodiments, the functionality of control system 1000 may be distributed across some or all of communication devices 1010. That is, in some embodiments, there may be no centralized point of control of the activity of pickers and/or stowers; rather, communication devices 1010 may function in a cooperative, distributed fashion to coordinate the activities of fulfillment center 100.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   determining a respective expected picking rate for each of a plurality of received inventory items that have yet to be stored in an inventory storage area having a plurality of zones;
   selecting a corresponding one of the plurality of zones of the inventory storage area for storing each of said received inventory items dependent upon its respective expected picking rate, wherein said plurality of zones is physically arranged within said inventory storage area such that an inner one of said zones is successively and at least partially surrounded by one or more other ones of said zones, wherein a nearest successive zone to the inner zone surrounds the inner zone on at least two sides or along a curved boundary between the inner zone and the nearest successive zone, wherein the nearest successive zone is larger than the inner zone, and wherein said selecting is performed such that respective expected picking rates of members of a given group of said received inventory items to be stored in said inner zone are less than the respective expected picking rates of members of another group of said received inventory items to be stored in the nearest successive zone; and
   storing each of said received inventory items within said corresponding selected zone.

2. The method as recited in claim 1, further comprising:
   distributing a plurality of pickers within an envelope of said inventory storage area, wherein said envelope encompasses at least a portion of each of said zones but less than all of at least one or more outer zones; and
   instructing said plurality of pickers to select inventory items stored within said envelope such that over time, said envelope progresses through said inventory storage area in an approximate rotation about an axis located at an innermost one of said zones.

3. The method as recited in claim 2, wherein said storing of each of said inventory items is performed by a plurality of stowers, wherein said plurality of stowers progresses through said inventory storage area about said axis in advance of said plurality of pickers.

4. The method as recited in claim 2, wherein for a given one of said inventory items, selecting said corresponding one of said plurality of zones is additionally dependent upon an expected dwell time of ones of said pickers within a portion of said corresponding zone included within said envelope.

5. The method as recited in claim 1, wherein for a given item, determining said respective expected picking rate is dependent upon historical customer ordering behavior for said given item.

6. The method as recited in claim 1, wherein for a given item, determining said respective expected picking rate is dependent upon expected future customer ordering behavior for said given item.

7. The method as recited in claim 1, further comprising determining a respective quantity of units to be stored for each of said plurality of inventory items, such that for each of said inventory items, said respective quantity of units to be stored and said respective expected picking rate are directly proportional.

8. The method as recited in claim 1, wherein said nearest successive zone completely surrounds said inner zone.

9. The method as recited in claim 1, wherein at least some of said zones are defined according to a rectilinear topology.

10. The method as recited in claim 1, wherein at least some of said zones are defined according to an elliptical topology.

11. The method as recited in claim 1, wherein a respective expected picking rate of any given inventory item stored within said inner zone is less than a respective expected picking rate of any given inventory item stored in any successive zone that at least partially surrounds said inner zone.

12. The method as recited in claim 1, wherein a respective expected picking rate of any given inventory item stored within said inner zone is probabilistically likely, within a probability threshold, to be less than a respective expected picking rate of any given inventory item stored in any successive zone that at least partially surrounds said inner zone.

13. The method as recited in claim 1, wherein storing a given one of said inventory items comprises:
   determining whether a number of units of said given inventory item to be stored exceeds a threshold value; and
   in response to determining that said number of units exceeds said threshold value, storing said number of units of said given inventory item in groups within said corresponding zone, wherein at least some of said groups include more than one unit of said given inventory item, and wherein each of said groups occupies a distinct location within said corresponding zone.

14. The method as recited in claim 13, wherein storing said given one of said inventory items further comprises:
   in response to determining that said number of units does not exceed said threshold value, storing each of said number of units of said given inventory item in a respective distinct location within said corresponding zone.

15. A tangible, computer-accessible storage medium comprising instructions, wherein the instructions are executable to:
- determine a respective expected picking rate for each of a plurality of received inventory items that have yet to be stored in an inventory storage area having a plurality of zones;
- select a corresponding one of the plurality of zones of the inventory storage area for each of said received inventory items dependent upon its respective expected picking rate, wherein said plurality of zones is physically arranged within said inventory storage area such that an inner one of said zones is successively and at least partially surrounded by one or more other ones of said zones, wherein a nearest successive zone to the inner zone surrounds the inner zone on at least two sides or along a curved boundary between the inner zone and the nearest successive zone, wherein the nearest successive zone is larger than the inner zone, and wherein said selecting is performed such that respective expected picking rates of members of a given group of said received inventory items to be stored in said inner zone are less than the respective expected picking rates of members of another group of said received inventory items to be stored in the nearest successive zone; and
- instruct that each of said received inventory items be stored within said corresponding.

16. The storage medium as recited in claim 15, wherein the instructions are further executable to:
- instruct that a plurality of pickers be distributed within an envelope of said inventory storage area, wherein said envelope encompasses at least a portion of each of said zones but less than all of at least one or more outer zones; and
- instruct said plurality of pickers to select inventory items stored within said envelope such that over time, said envelope progresses through said inventory storage area in an approximate rotation about an axis located at an innermost one of said zones.

17. The storage medium as recited in claim 16, wherein said inventory items are stored by a plurality of stowers, and wherein the instructions are further executable to instruct said plurality of stowers to progress through said inventory storage area about said axis in advance of said plurality of pickers.

18. The storage medium as recited in claim 16, wherein for a given one of said inventory items, the instructions are further executable to select said corresponding one of said plurality of zones additionally dependent upon an expected dwell time of ones of said pickers within a portion of said corresponding zone included within said envelope.

19. The storage medium as recited in claim 15, wherein for a given item, said instructions are executable to determine said respective expected picking rate dependent upon historical customer ordering behavior for said given item.

20. The storage medium as recited in claim 15, wherein for a given item, said instructions are executable to determine said respective expected picking rate dependent upon expected future customer ordering behavior for said given item.

21. The storage medium as recited in claim 15, wherein the instructions are further executable to determine a respective quantity of units to be stored for each of said plurality of inventory items, such that for each of said inventory items, said respective quantity of units to be stored and said respective expected picking rate are directly proportional.

22. The storage medium as recited in claim 15, wherein said nearest successive zone completely surrounds said inner zone.

23. The storage medium as recited in claim 15, wherein at least some of said zones are defined according to a rectilinear topology.

24. The storage medium as recited in claim 15, wherein at least some of said zones are defined according to an elliptical topology.

25. The storage medium as recited in claim 15, wherein a respective expected picking rate of any given inventory item stored within said inner zone is less than a respective expected picking rate of any given inventory item stored in any successive zone that at least partially surrounds said inner zone.

26. The storage medium as recited in claim 15, wherein a respective expected picking rate of any given inventory item stored within said inner zone is probabilistically likely, within a probability threshold, to be less than a respective expected picking rate of any given inventory item stored in any successive zone that at least partially surrounds said inner zone.

27. The storage medium as recited in claim 15, wherein to store a given one of said inventory items, said instructions are further executable to:
- determine whether a number of units of said given inventory item to be stored exceeds a threshold value; and
- in response to determining that said number of units exceeds said threshold value, store said number of units of said given inventory item in groups within said corresponding zone, wherein at least some of said groups include more than one unit of said given inventory item, and wherein each of said groups occupies a distinct location within said corresponding zone.

28. The storage medium as recited in claim 27, wherein to store a given one of said inventory items, said instructions are further executable to:
- in response to determining that said number of units does not exceed said threshold value, store each of said number of units of said given inventory item in a respective distinct location within said corresponding zone.

* * * * *